(12) United States Patent
Yoshitani

(10) Patent No.: US 11,314,995 B2
(45) Date of Patent: Apr. 26, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Akihiro Yoshitani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/209,423

(22) Filed: Mar. 23, 2021

(65) Prior Publication Data

US 2021/0303946 A1 Sep. 30, 2021

(30) Foreign Application Priority Data

Mar. 31, 2020 (JP) .............................. JP2020-063577

(51) Int. Cl.
*G06K 15/02* (2006.01)
(52) U.S. Cl.
CPC ..... *G06K 15/1843* (2013.01); *G06K 15/1865* (2013.01); *G06K 15/1886* (2013.01)
(58) Field of Classification Search
CPC ........... G06K 15/1843; G06K 15/1865; G06K 15/1886
See application file for complete search history.

(56) References Cited

U.S. PATENT DOCUMENTS

| 6,181,818 | B1 | 1/2001 | Sato et al. | |
|---|---|---|---|---|
| 6,246,804 | B1 | 6/2001 | Sato et al. | |
| 6,972,874 | B2 | 12/2005 | Izumi et al. | |
| 9,674,398 | B2 | 6/2017 | Yoshitani | |
| 11,093,194 | B2 * | 8/2021 | Tsugimura | G06K 15/1817 |
| 2001/0016075 | A1 * | 8/2001 | Klassen | G06T 9/007 |
| | | | | 382/233 |
| 2001/0017946 | A1 * | 8/2001 | Klassen | G06T 3/602 |
| | | | | 382/296 |
| 2006/0139446 | A1 * | 6/2006 | Kuroki | H04N 19/427 |
| | | | | 348/14.13 |
| 2007/0019870 | A1 * | 1/2007 | Mizoguchi | H04N 19/60 |
| | | | | 382/233 |
| 2007/0103722 | A1 * | 5/2007 | Sato | G06T 3/602 |
| | | | | 358/1.15 |

(Continued)

FOREIGN PATENT DOCUMENTS

| JP | 2006-304243 A | | 11/2006 | |
|---|---|---|---|---|
| JP | 2006313495 A | * | 11/2006 | ......... H04N 1/00233 |
| JP | 3951791 B2 | * | 8/2007 | ......... H04N 1/00413 |

*Primary Examiner* — Ted W Barnes
(74) *Attorney, Agent, or Firm* — Venable LLP

(57) ABSTRACT

An image processing comprising: an obtaining unit configured to obtain image data of a rectangle unit of input image; a compression unit configured to perform the compression processing for compressing the image data on a per rectangle unit basis from the rectangle unit at the front edge to the rectangle unit at the rear edge of the rectangle line in a case where the input image is rotated by a predetermined angle in a first direction; wherein, in a case where the input image is rotated by the predetermined angle in a direction opposite to the first direction, the compression unit compresses the image data on a per rectangle unit basis from the rectangle unit at the rear edge to the rectangle unit at the front edge of the rectangle line.

17 Claims, 15 Drawing Sheets

(56) References Cited

U.S. PATENT DOCUMENTS

| | | | |
|---|---|---|---|
| 2008/0225053 A1* | 9/2008 | Obinata | G09G 5/39 |
| | | | 345/555 |
| 2008/0226164 A1* | 9/2008 | Obinata | H04N 19/50 |
| | | | 382/166 |
| 2009/0074308 A1* | 3/2009 | Sasaki | H04N 19/426 |
| | | | 382/232 |
| 2010/0245914 A1* | 9/2010 | Harada | H04N 1/33315 |
| | | | 358/1.16 |
| 2012/0154856 A1 | 6/2012 | Yoshitani | |
| 2015/0374313 A1* | 12/2015 | Kogure | H04N 19/17 |
| | | | 382/131 |
| 2016/0352964 A1* | 12/2016 | Maeda | H04N 1/3877 |
| 2020/0104660 A1* | 4/2020 | Ohhashi | G06K 15/1861 |
| 2020/0167967 A1* | 5/2020 | Hara | G06T 9/007 |
| 2020/0272396 A1* | 8/2020 | Tsugimura | G06F 3/124 |
| 2020/0272869 A1* | 8/2020 | Hasegawa | G06K 15/1865 |

* cited by examiner

IMAGE PROCESSING APPARATUS, IMAGE PROCESSING METHOD, AND STORAGE MEDIUM

BACKGROUND OF THE INVENTION

Field of the Invention

The present disclosure relates to an image processing apparatus, an image processing method, and a storage medium.

Description of the Related Art

There is a case in which an input image is rotated by a predetermined angle for output. For example, there is a recording apparatus that scans a document and performs copying operation on an obtained input image by use of a recording technology such as a laser or inkjet recording technology. In such an apparatus, there is a case in which an input image is rotated by 90 degrees so as to print the rotated input image on printing paper for output. In a case of rotating an input image for output, there is a method of compressing the input image and then rotating the image, in order to save memory usage.

In Japanese Patent Laid-Open No. 2006-304243, there is disclosed a method in which column data of a compressed image is decoded by use of an analysis table generated by analyzing compressed image data, which is obtained by compressing an input image, and transformed into row data of the image to be output, so that the input image is rotated by 90 degrees.

In the recording apparatus, the print head performs recording on printing paper in accordance with conveyance of the printing paper, so as to perform recording on the printing paper from an end of an image. Therefore, in order to rotate an input image for output in a memory usage saving manner, it is necessary to output an image by performing decompression from the compressed image data corresponding to the side on which the recording is firstly performed in the rotated image.

However, in the method of Japanese Patent Laid-Open No. 2006-304243, in a case of rotating the input image by 270 degrees for output, it is not possible to perform decompression from the compressed image data corresponding to the side on which the recording is firstly performed in the rotated image. Therefore, it is not possible to rotate the input image by 270 degrees for output in a memory usage saving manner.

SUMMARY OF THE INVENTION

The image processing apparatus of the present disclosure is an image processing apparatus capable of rotating an input image for output, the image processing apparatus comprising: an obtaining unit configured to obtain image data of a rectangle unit of the input image in an order from a rectangle line at a head of a longitudinal direction, the rectangle unit being a unit for compression processing, the input image being configured such that the rectangle line configured with respective rectangle units arranged from a front edge to a rear edge in a lateral direction is arranged in the longitudinal direction that intersects with the lateral direction; a compression unit configured to perform the compression processing for compressing the image data on a per rectangle unit basis from the rectangle unit at the front edge to the rectangle unit at the rear edge of the rectangle line on a per rectangle line basis in order to generate compressed data of the input image in a case where the input image is rotated by a predetermined angle in a first direction for output so that the rectangle unit at the front edge in the rectangle line at the head of the input image is positioned at a head of a longitudinal direction of a rotated image; and a decompression unit configured to decompress, rotate, and arrange the compressed data corresponding to the respective rectangle units, in order to output an image, wherein, in a case where the input image is rotated by the predetermined angle in a direction opposite to the first direction for output, the compression unit compresses the image data on a per rectangle unit basis from the rectangle unit at the rear edge to the rectangle unit at the front edge of the rectangle line.

Further features of the present invention will become apparent from the following description of exemplary embodiments with reference to the attached drawings.

DESCRIPTION OF THE EMBODIMENTS

Hereinafter, embodiments will be described in detail.

First Embodiment

In the present embodiment, an explanation is given of the method in which, in a case of rotating an input image for output, the input image is compressed and the compressed data obtained by the compression is rotated and output after decompression, so that the input image is rotated in a memory usage saving manner.

[About the Configuration of the Recording Apparatus]

Figure 1:
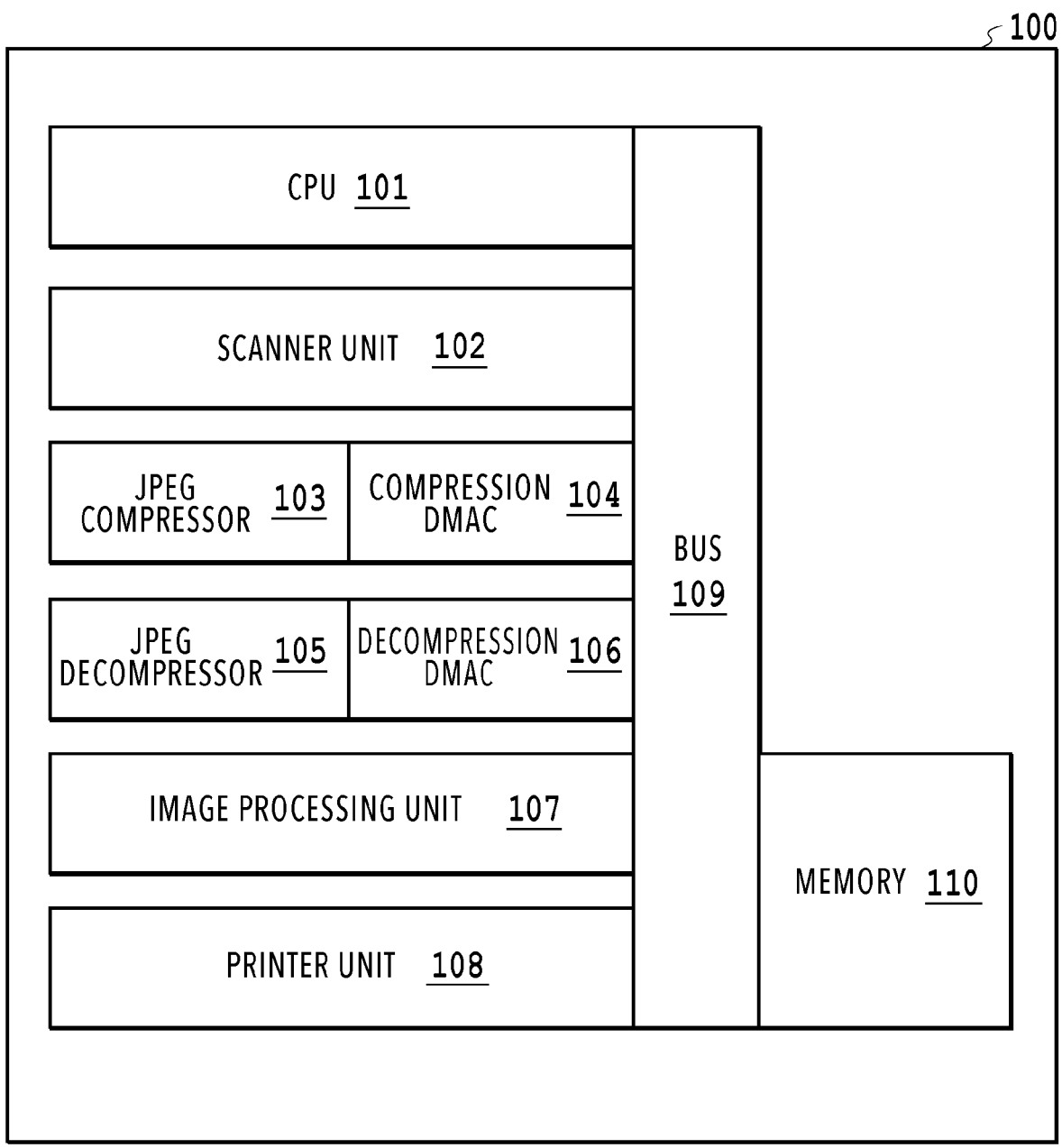
FIG. 1 is a block diagram illustrating a configuration of a recording apparatus.

FIG. 1 is a block diagram of a recording apparatus 100 that functions as an image processing apparatus as well in the present embodiment.

The CPU 101 is a processor that comprehensively controls each part of the recording apparatus 100.

The scanner unit 102 is a scanner for reading a document to obtain RGB multi-valued bit map image data. Alternatively, it is also possible that the scanner unit 102 is not a scanner but an I/F capable of obtaining image data of an input image from another apparatus in raster order. The bit map image data obtained by reading a document with the scanner unit 102 is stored in the memory 110.

The JPEG compressor 103 and the compression DMAC 104 are compression units having a function of compressing image data in the recording apparatus 100. The JPEG compressor 103 performs compression processing on image data of an input image on a per MCU basis. The following explanation will be given on the premise that the compression method is JPEG-compression, but the compression method is not limited to JPEG. Further, the JPEG compressor 103 has a memory that can internally store image data of one MCU. An MCU is a unit for the compression processing, and the details thereof will be described later.

The compression DMAC 104 reads uncompressed image data of an input image from the memory 110 in the order described later and supplies the uncompressed image data to the JPEG compressor 103 on a per MCU basis. Further, the compression DMAC 104 is a DMA controller that outputs JPEG data, which is obtained by performing compression with the JPEG compressor 103, to the memory 110.

The JPEG decompressor 105 and the decompression DMAC 106 are decompression units having a function of decompressing image data in the recording apparatus 100. The JPEG decompressor 105 performs decompression processing on JPEG data on a per JPEG data corresponding to an MCU basis. The JPEG decompressor 105 has an internal memory that can store image data of one MCU. Further, the JPEG decompressor 105 has a function of rotating image data in an MCU by 90 degrees to the right or 270 degrees to the right by use of the internal memory.

The decompression DMAC 106 reads JPEG data from the memory 110 in the order described later and supplies the JPEG data to the JPEG decompressor 105. Further, the decompression DMAC 106 outputs uncompressed image data that is obtained by performing decompression with the JPEG decompressor 105 to the memory 110 in the order described later.

The image processing unit 107 performs predetermined image processing on the uncompressed image data that is output to the memory 110 by the decompression DMAC 106, so as to output binarized or multi-valued quantization data to be used for output of the printer unit 108. The printer unit 108 is a recording unit (printer) having a print head for recording the quantization data, which is output by the image processing unit 107, on a recording medium, such as printing paper, for output.

The following explanation will be given on the premise that the JPEG compressor 103, the compression DMAC 104, the JPEG decompressor 105, the decompression DMAC 106, and the image processing unit 107 of FIG. 1 are implemented by hardware such as an ASIC or an electronic circuit. However, it is also possible that all or a part of the functions of each part is implemented by loading program codes stored in the ROM (not illustrated in the drawing) into the RAM (not illustrated in the drawing) and executing the program codes with the CPU 101.

The memory 110 is a memory that stores processing results of each of the above-described blocks. The bus 109 transfers data between each of the above-described blocks and the memory 110.

[About the Rotation Processing of Image Data]

Figure 2A:
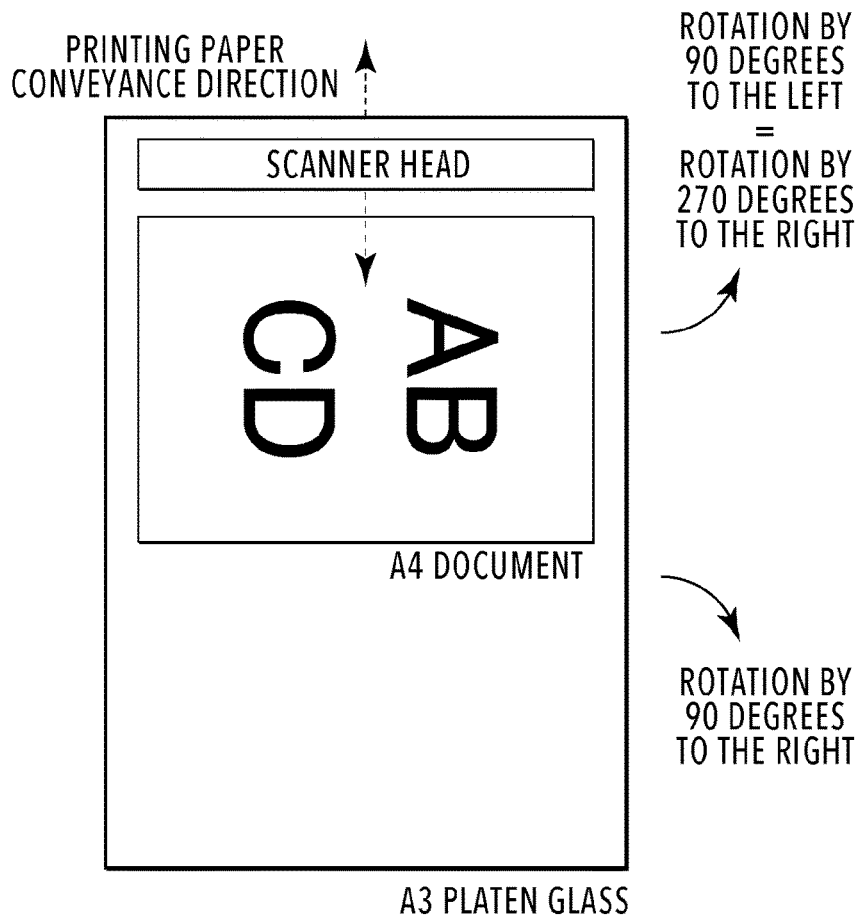
FIG. 2A through FIG. 2C are diagrams illustrating directions of operation of a scanner unit and a printer unit in a case of performing double-side printing.
Figures 2B, 2C:
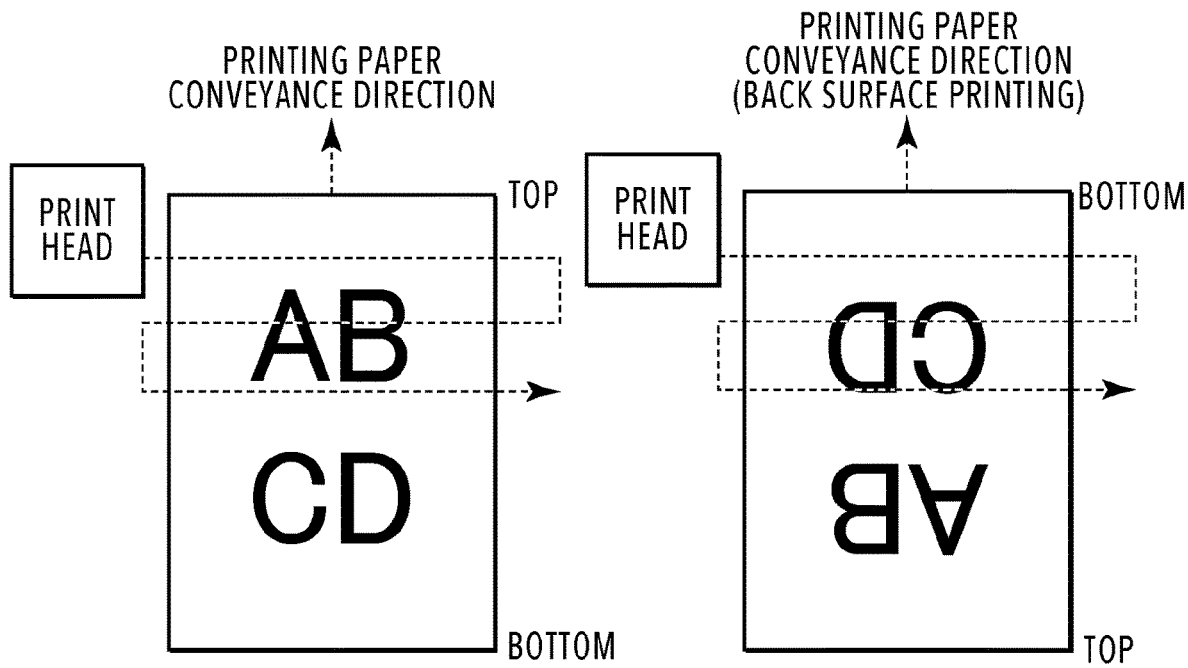

FIG. 2A through FIG. 2C are diagrams for explaining how an A4-size document placed on a platen glass of the recording apparatus 100 is read and recorded (printed) on printing paper, which is a recording medium. The recording apparatus 100 is a recording apparatus that scans a document and performs copying operation by use of a recording technology such as a laser or inkjet recording technology.

FIG. 2A is a top view of a document placed on the platen glass of the recording apparatus 100 of the present embodiment. As illustrated in FIG. 2A, the scanner unit 102 of the recording apparatus 100 includes a scanner head with a length of the width direction of the A3-size platen glass (length of the long side direction of A4). As illustrated in FIG. 2A, there is a case in which a document is placed so that the long side direction of the A4-size document is aligned with the width direction of the platen glass. In this case, the scanner head scans each line along the long side direction of the document, and the scanner head operates along the long side direction of the platen glass, so that an A4-size scanned image in such an orientation that the length in the lateral direction is longer than the length in the longitudinal direction can be obtained as an input image.

Further, in a case of printing an A4-size image, there is a case in which the orientation of the output printing paper is decided. For example, the long side direction of the printing paper may be the conveyance direction of the printing paper. In this case, the image data of the input image, which is obtained by scanning, is rotated by 90 degrees to the right, and the print head performs printing from the downstream side of the A4-size printing paper in the conveyance direction, based on the image data obtained by the rotation.

If a memory that can store image data of an A4-size input image, which is obtained by scanning a document, without compression is mounted on such a recording apparatus, the rotation processing of the input image can be performed directly. However, in order to store the image data of an A4-size input image without compression, a memory capacity of about 100 megabytes is required for a 600-dpi color image, and it may be difficult to secure a memory of that capacity in the recording apparatus. Therefore, the image data of an input image is stored in the memory in a compressed state by use of a method such as JPEG, and the compressed data is rotated at the time of decompression for output, so that the rotation processing is performed in a memory usage saving manner. The details of this rotation processing will be described later.

In addition, there is a recording apparatus including a switchback mechanism, in which, in a case where printing is performed on both surfaces of printing paper, after printing is performed on the front surface of the printing paper, the switchback operation is performed for the printing paper so as to flip the front surface and the back surface of the printing paper, and then printing on the back surface of the printing paper is performed.

Figure 3A:
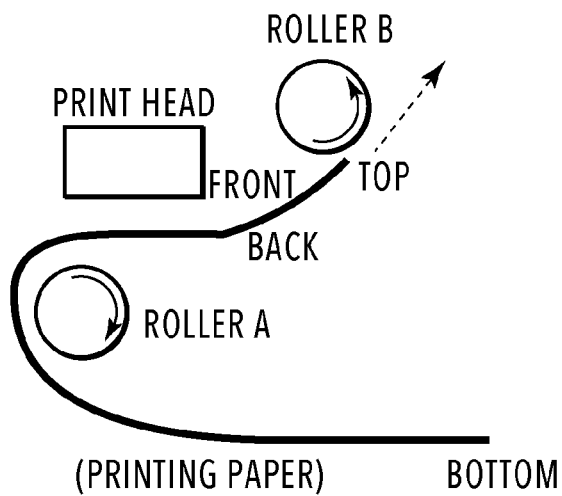
FIG. 3A through FIG. 3D are diagrams illustrating conveyance directions of printing paper in the recording apparatus that performs double-side printing with a switchback.
Figure 3B:
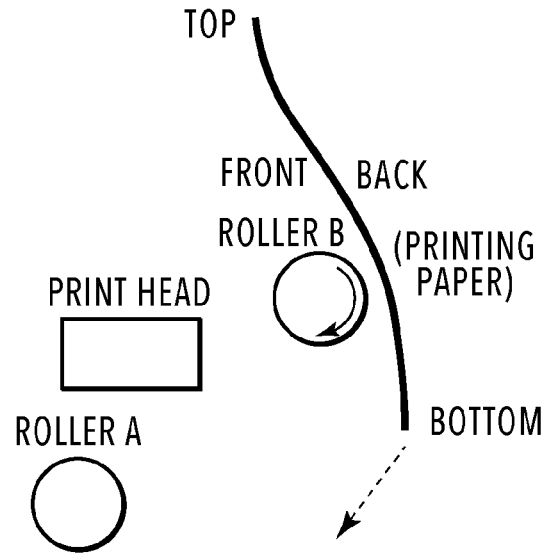
Figure 3C:
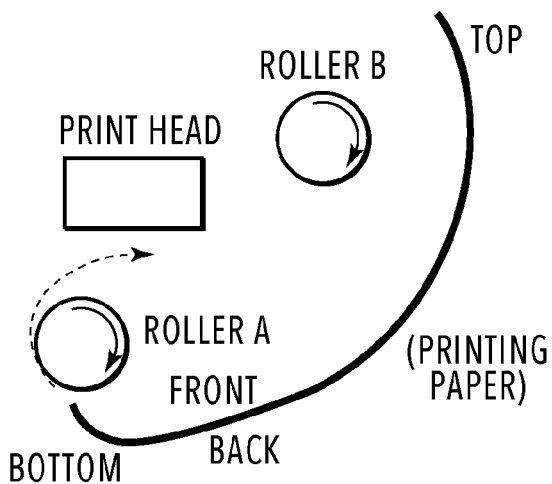
Figure 3D:
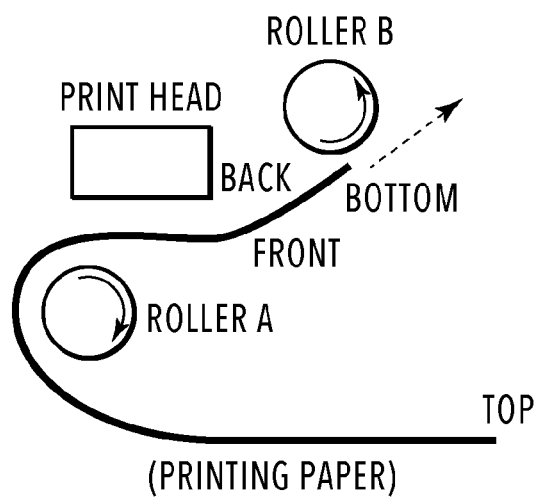

FIG. 3A through FIG. 3D are side views of the print head and the conveyance path of printing paper of the recording apparatus 100. The switchback operation will be explained with reference to FIG. 3A through FIG. 3D. First, as illustrated in FIG. 3A, the roller A pulls the printing paper from one side (for convenience, this one side of the printing paper is referred to as "top"), so that printing on the front surface is performed. Next, after printing on the front surface is finished and the roller B conveys the printing paper up to the end of the bottom side of the printing paper, the roller B rotates in the reverse direction as illustrated in FIG. 3B, in order to convey the printing paper from the "bottom", which is in the opposite direction of the "top". The roller A operates in the same manner as the time of printing on the front surface, so as to convey the printing paper from the "bottom" of the printing paper to the print head as illustrated in FIG. 3C. Then, in a case where the printing paper reaches the position of the print head as illustrated in FIG. 3D, the print head performs printing from the bottom of the back surface of the printing paper. For double-side printing, such a conveyance operation of printing paper is performed.

Therefore, for example, consider a case in which printing is performed on both surfaces of one sheet of printing paper with two pages of input images, which are obtained by sequentially placing and scanning the same two documents with the words of "ABCD" illustrated in FIG. 2A in the same orientation on the platen glass. In this case, if the first page of the input images is rotated by 270 degrees to the right (90 degrees to the left) and printed on the front surface of the printing paper as illustrated in FIG. 2B, the second page of input images is required to be rotated by 90 degrees to the right and printed on the back surface of the printing paper as illustrated in FIG. 2C. By performing printing in this way, double-side printing is performed with the correct orientations of the images. Therefore, the rotation processing for the image data of input images may require not only the rotation processing of 90 degrees but also the rotation processing of 270 degrees.

[The Compression Processing and the Decompression Processing of a Comparative Example]

Figure 4:
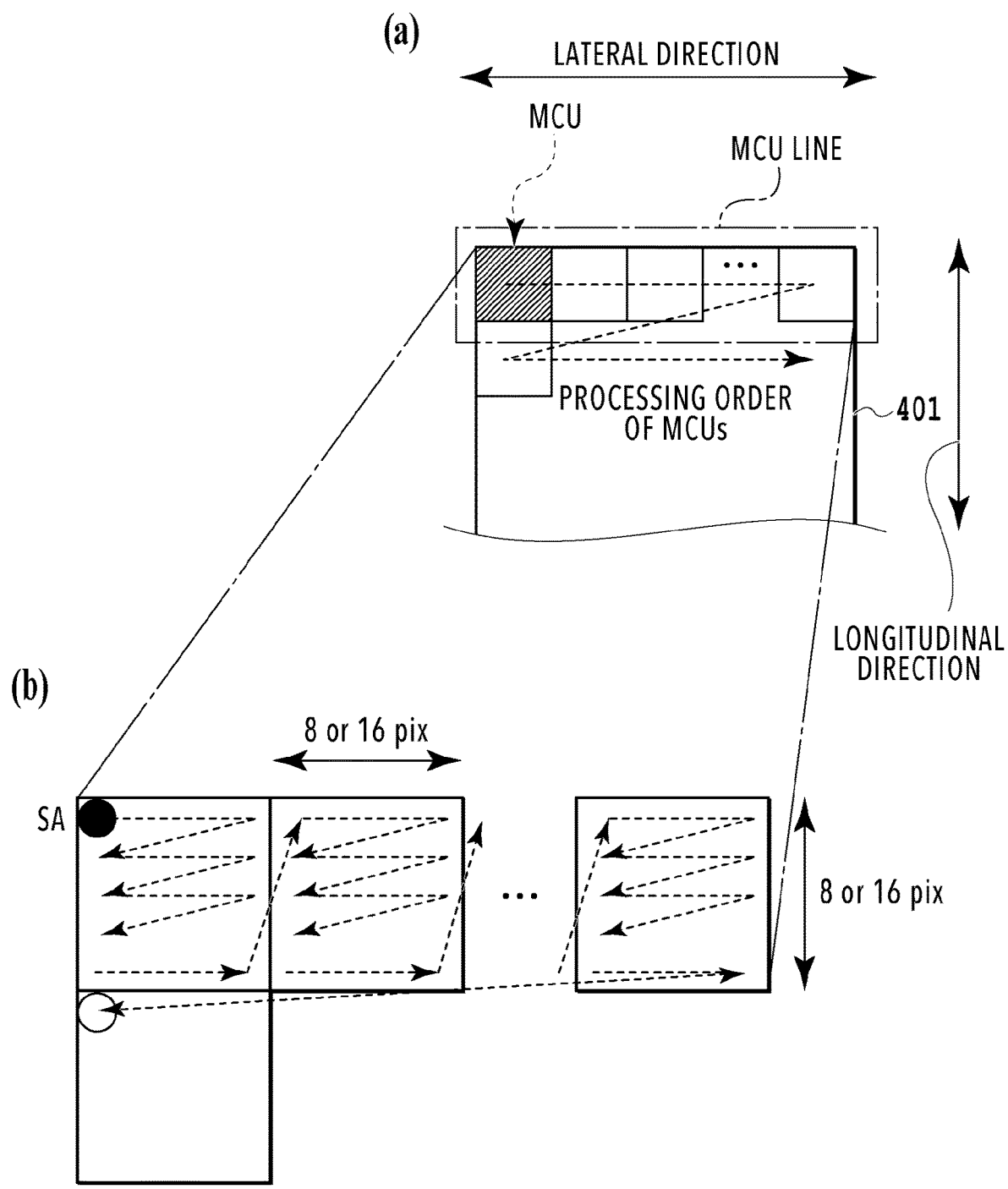
FIG. 4 is diagram for explaining MCUs and MCU lines.

FIG. 4 is diagram for explaining general image compression processing as a comparative example. Here, a comparative example of the processing for JPEG-compression of the image data of an input image will be explained. For the JPEG-compression of the uncompressed image data of an input image, the input image is divided into rectangle units that are referred to as MCUs (Minimum Coded Units) such as laterally and longitudinally 8 by 8 or 16 by 16 pixels. The MCU group of one lateral row is hereinafter referred to as an "MCU line" or "rectangle line". Further, the following explanation will be given on the premise that the direction in which MCU lines extend in an image is the lateral direction of the image and the direction intersecting with the lateral direction is the longitudinal direction.

The image obtained by scanning a line of a document with the scanner head corresponds to a line of the image of an input image in the lateral direction. That is, the direction in which the scanner head extends is the same as the direction in which an MCU line extends. Further, the head (top side) of an input image in the longitudinal direction is the side of the image that the scanner head firstly obtains by reading a document. As will be described later, since an input image is compressed from the MCU line on the top side of the longitudinal direction of the input image, it is possible to compress the input image without requiring a memory capacity capable of storing all the uncompressed image data of the input image.

As illustrated with the dotted arrow in FIG. 4(a), regarding the processing order of MCUs in the comparative example, the compression processing of the MCUs is performed in raster order from the MCU on the top left of the input image. Further, within an MCU, as illustrated with the dotted arrows in FIG. 4(b), the address indicating the top leftmost pixel of the input image is regarded as an SA (start address), and the compression processing is performed by scanning each pixel in raster order within an MCU and inputting each pixel to a JPEG compressor. If the compression processing for one line (1 MCU line) of the MCU lines ends, the same compression processing is performed from the MCU of the left side end, that is, the front edge of the immediately-below MCU line, to the MCU of the rear edge. By continuing this processing up to the end of one page, the JPEG data for one page of the input image is created. That is, the image data is compressed on a per MCU and MCU line basis for generating JPEG data.

Figure 5:
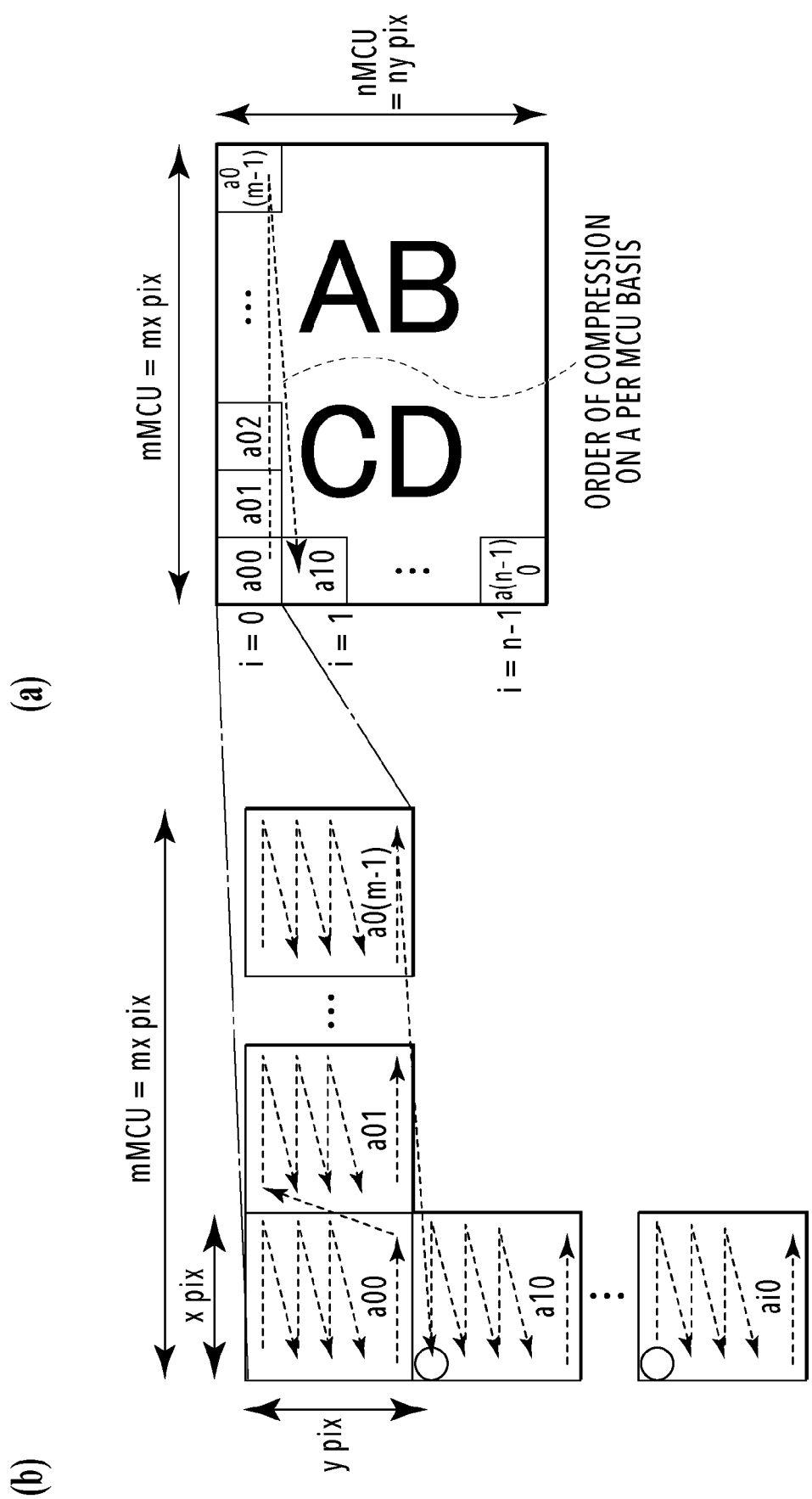
FIG. 5 is diagram illustrating a processing order on a per MCU basis for compression in a comparative example.

FIG. 5 is diagram for explaining the size of an MCU. As illustrated in FIG. 5(b), regarding the pixel count for one MCU (1 MCU), the lateral pixel count is x, and the longitudinal pixel count is y. Further, as illustrated in FIG. 5(a), the number of MCUs of the input image in the longitudinal direction is defined as n, and the number of MCUs in the lateral direction is defined as m. That is, the image size can be expressed as laterally mx pixels and longitudinally ny pixels, and 1 MCU line is configured with m MCUs (mMCU).

For the sake of explanation, the MCUs are numbered in such a manner as "a00", "a01", . . . , "a0 (m−1)", "a10", "a11", . . . , "a1 (m−1)", . . . , "a(n−1)(m−1)" in the order of compression. For example, the x-th MCU that configures the i-th MCU line (referred to as the iMCU line) from the top of the image in the longitudinal direction is numbered as "aix". That is, "ai0" indicates the MCU on which the compression processing was firstly performed in the iMCU line, and, in the case of FIG. 5, "ai0" indicates the leftmost MCU of the iMCU line. Note that i=0 corresponds to the head of the MCU lines.

Next, the decompression processing of the comparative example will be explained. In the decompression processing, it is necessary to firstly obtain the start bit position, which is the first bit position of each MCU line in the JPEG data, and the direct-current component value of the start position of each MCU line. Therefore, firstly, an empty decoding processing for obtaining them is performed.

Figure 6:
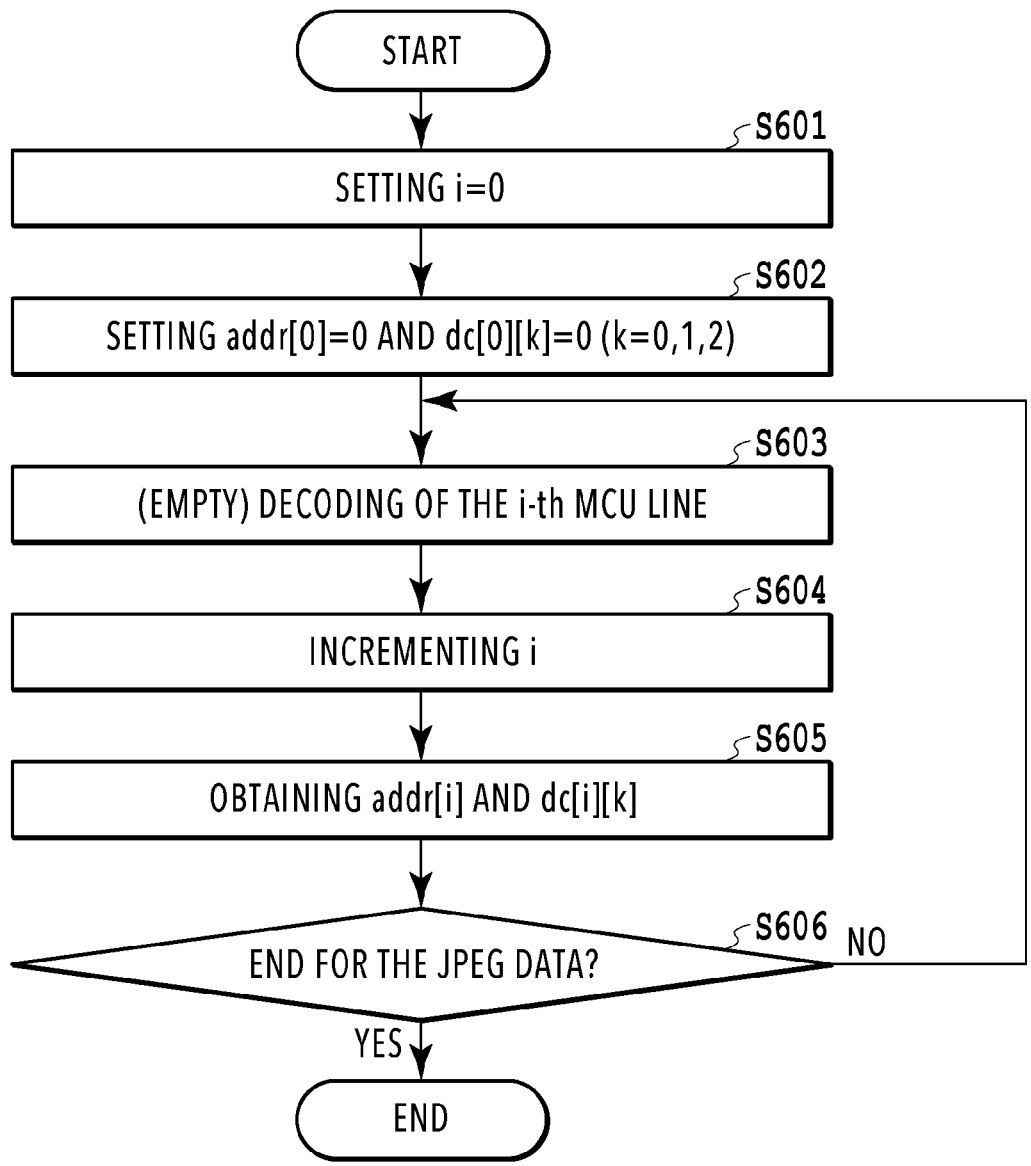
FIG. 6 is a flowchart for explaining an empty decoding processing.

FIG. 6 is a flowchart for explaining the empty decoding processing. Note that the following explanation will be given on the premise that the processing of FIG. 6 is performed by the JPEG decompressor 105 and the decompression DMAC 106 of the recording apparatus 100. Note that the symbol "S" in the explanation of each process means that it is a step in the flowchart, and the same applies to the following flowcharts.

In S601, the decompression DMAC 106 sets the loop counter i to 0 (i=0) and starts processing.

In S602, the decompression DMAC 106 sets each variable, such as addr[0]=0 and dc[0][k]=0 (k=0, 1, 2). "addr[i]" is the address value of the JPEG data indicating the start bit position of the iMCU line in the JPEG data. "dc[i][k]" is the direct-current component value of each color component at the start of the iMCU line.

Of the JPEG data, in S603, the decompression DMAC 106 causes the JPEG decompressor 105 to decompress the JPEG data of the iMCU line (m MCUs configuring the iMCU line). In the present step, it is not necessary to output the image represented by the decompressed data. Therefore, the processing of the present flowchart is referred to as empty decoding.

In S604, the decompression DMAC 106 increments the loop counter i.

In S605, the decompression DMAC 106 obtains and stores the start bit position addr[i] and the direct-current component value dc[i][k] of the iMCU line of the JPEG data, which are obtained as a result of the empty decoding processing of S603. That is, information of the bit position of the JPEG data indicating the start position within the leftmost MCU, which is the "first MCU" of the MCUs configuring the iMCU line to be processed, and the direct-current component value of each color component of the pixel at the start position of the iMCU line is obtained. k=0, 1, 2 refers to the Y component, the Cb component, and the Cr component, respectively.

In the decompression processing for outputting an uncompressed image from the JPEG data, which is performed after the end of the present flowchart, the decompression processing is performed from the JPEG data at the head of the iMCU line. Since the information of the start bit position addr[i] and the direct-current component value dc[i][k] of each MCU line is required for decompressing the JPEG data from the head of the iMCU lines, they are obtained in the present step.

In S606, the decompression DMAC 106 determines whether the adrr[i] and the direct-current component values dc[i][k] of all the JPEG data, that is, of the n MCU lines, have been obtained. If the values of the n MCU lines have been obtained (YES in S606), the processing of the present flowchart ends. If the values for the n MCU lines have not been obtained (NO in S606), the processing returns to S603, so that the processes of S603 through S606 are repeated. By the above-described flow of FIG. 6, the start bit position of each MCU line and the direct-current component value of the start position of the MCU line can be obtained.

Figure 7:
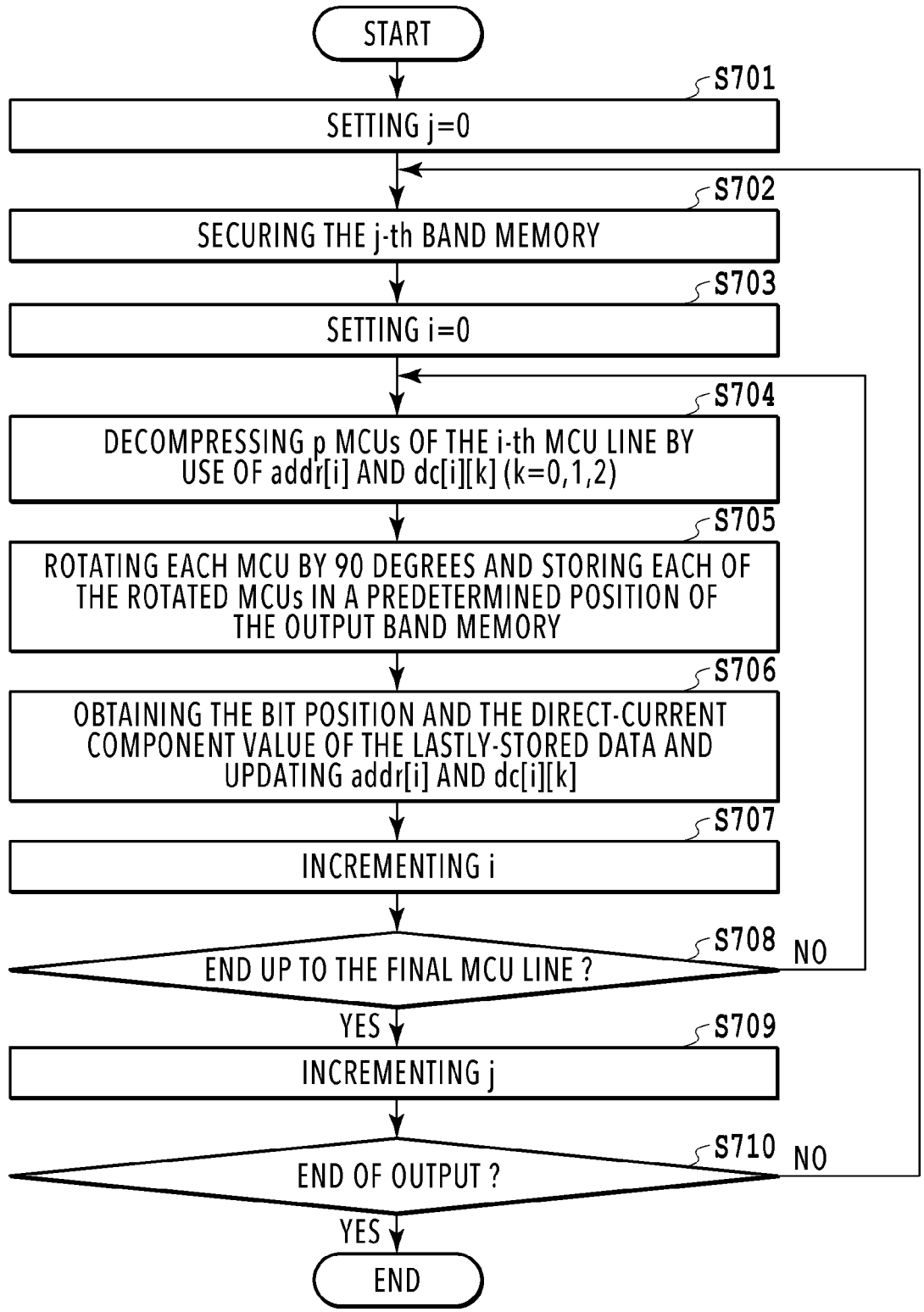
FIG. 7 is a flowchart for explaining decompression processing in the comparative example.

Next, with reference to the flowchart of FIG. 7, the decompression processing in the comparative example for rotating an input image for output will be explained. For convenience of explanation, the following explanation will be given on the premise that the processing of FIG. 7 is performed by the JPEG decompressor 105 and the decompression DMAC 106 of the recording apparatus 100.

In S701, the decompression DMAC 106 sets the counter j to 0 (=0). Note that the counter j is incremented in a case where the image of one band of the input image is rotated and output.

In S702, the decompression DMAC 106 secures an area in the memory as a band memory B in which the pixel values of one band, which is an area in the size of ny*px pixels in the input image, can be stored in an uncompressed state. Note that p is smaller than m (p<m).

Figure 8:
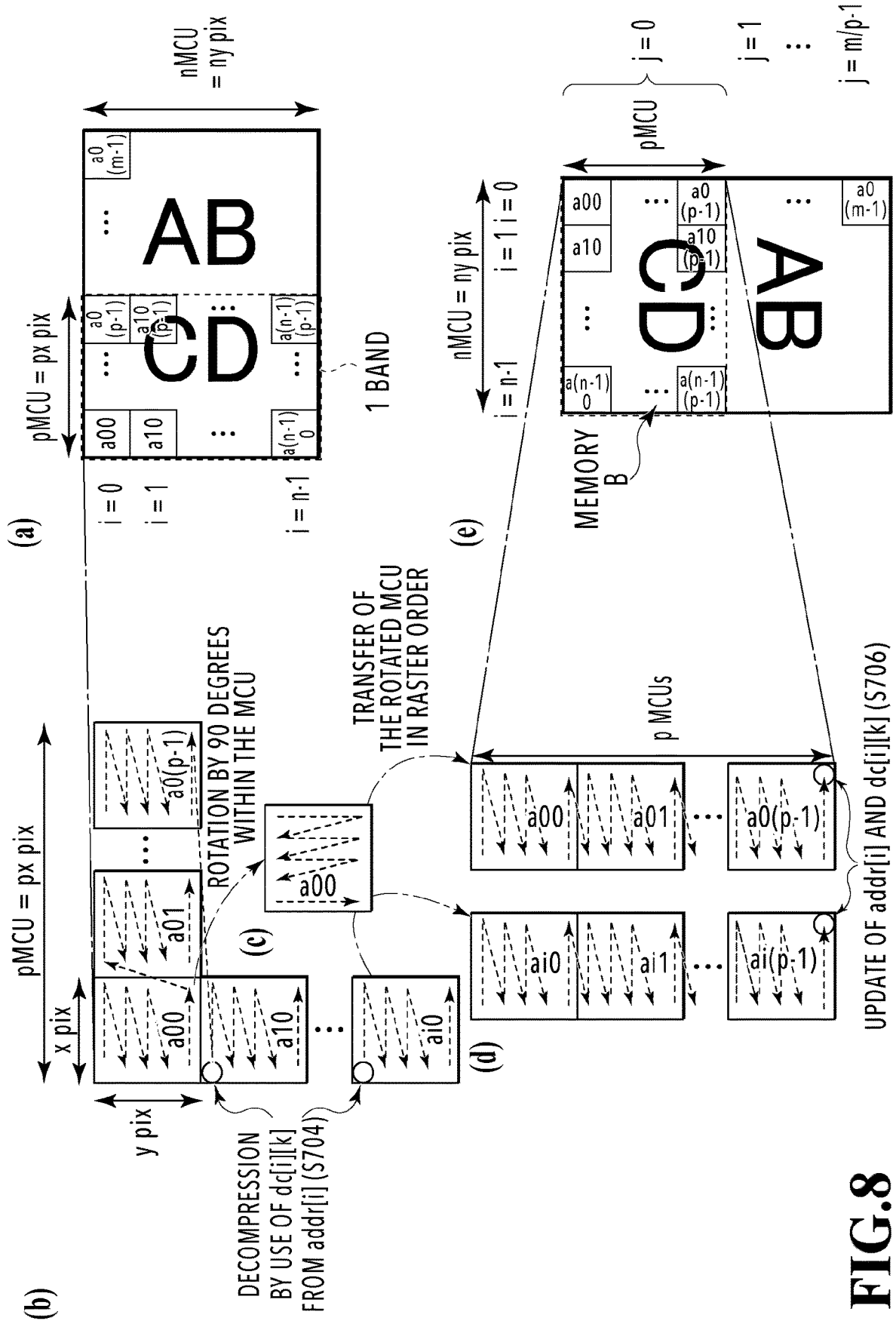
FIG. 8 is diagram for explaining compression and decompression processing in a case of rotation by 90 degrees to the right.

FIG. 8 is diagram for explaining the positions of the MCUs of an input image and the positions of the MCUs of the image to be output. FIG. 8(a) is a diagram illustrating the positions of the MCUs in an input image. As illustrated in FIG. 8(a), one band corresponds to the pixels configuring an area in the size of laterally p MCUs and longitudinally n MCU lines of the input image.

Note that it is also possible to secure the band memory B in advance before the processing of the present flowchart. Further, in a case where j is equal to or greater than 1 (j≥1), the present step will be suspended until the band memory B used in the (j−1)th processing is made available.

In S703, the decompression DMAC 106 sets the counter i to 0 (i=0).

In S704, the decompression DMAC 106 decompresses the JPEG data from the bit position of addr[i] by use of the direct-current component values dc[i][k] (k=0, 1, 2). The decompression DMAC 106 performs the decompression processing on the JPEG data of p consecutive MCUs among the MCUs included in the iMCU line. Specifically, the decompression processing is performed on only the JPEG data of p consecutive MCUs from the MCU of "ai(p*j)" of the iMCU line. In the compression processing of this comparative example, the image data of the MCUs is compressed from the leftmost MCU to the rightmost MCU of the iMCU line of the input image. Therefore, the leftmost MCU of the input image is the 0th MCU in the iMCU line, and the decompression DMAC 106 decompresses the JPEG data of p MCUs from the (p*j)th MCU to the right.

FIG. 8(a) is a diagram illustrating the positions of the MCUs in the input image. In a case where j is equal to 0 and i is equal to (j=0, i=0), the decompression processing of the JPEG data of p MCUs from "a00" up to "a0(p−1)" is completed as a result of completing the processing up to the present step.

In S705, the decompression DMAC 106 rotates the decompressed data by 90 degrees to the right for each MCU and stores the data (pixel values) obtained by the decompression at a predetermined address in the band memory B. As illustrated in FIG. 8(c), regarding the pixel values of each MCU after the decompression, the JPEG decompressor 105 controls the output order to perform the rotation processing on a per MCU basis. Then, as illustrated in FIG. 8(d), the pixel values are stored in the band memory B so that the pixel values within the decompressed and rotated MCUs are arranged at predetermined positions in the image. The predetermined positions in the image are such positions where the MCUs are arranged in order from the top right edge of the image as illustrated in FIG. 8(e).

At the start of S706, the JPEG data of the p MCUs in the iMCU line is in a decompression processing completed state. In S706, at the point in time where the processing of the present step is started, the decompression DMAC 106 stores the bit position of the JPEG data on which the decompression processing is lastly performed (the bit position from the start position in the JPEG data) in addr[i]. Further, the decompression DMAC 106 stores the direct-current component value at this point in time in dc[i][k]. In this way, addr[i] and dc[i][k] are updated, respectively.

The updated addr[i] and dc[i][k] are used for the i-th decompression processing of S704 after j is incremented. In a case where j is equal to or greater than 1 (j≥1), that is, in S704 for outputting the image of the second or subsequent band, the decompression processing is performed by use of addr[i] and dc[i][k] that are previously updated in S706 for (j−1).

The algorithm for the JPEG-compression is processing performed in raster order. That is, as illustrated in FIG. 5, in the MCU line in a case where i is equal to 0 (i=0), the compression processing is performed in the order from the "a00" MCU to the "a0(m−1)" MCU. Therefore, in order to perform the decompression processing on the JPEG data except for the first one, it is necessary to refer to each value obtained by decompressing the JEPG data of the MCU on which the compression processing was lastly performed before that MCU to be processed. In the case of the comparative example, in order to decompress the JPEG data corresponding to an MCU, each value obtained by decompressing the JPEG data of the adjacent MCU on the left side of that MCU (for a leftmost MCU, the rightmost MCU of the immediately-above MCU line) is required.

In S707, the decompression DMAC 106 increments the counter i.

In S708, the decompression DMAC 106 determines whether the decompression processing on the JPEG data of the last n-th MCU line of the input image is completed. If the processing on the n-th MCU line has not been completed, that is, in a case of not i=n (NO in S708), the processing returns to S704 so that S704 through S708 are repeated.

If the processing is completed up to the n-th MCU line, that is, in a case of i=n (YES in S708), the uncompressed image data of which the image of one band of the input image is rotated by 90 degrees to the right is stored in the band memory B. Therefore, the processing proceeds to S709, and the decompression DMAC 106 increments the counter j.

If the processing up to S709 is completed, the JPEG data corresponding to one band that is the longitudinally each (n) multiplied by laterally p MCUs is in a state of being decompressed, rotated by 90 degrees, and stored in the band memory B. That is, in a case of j=0, the JPEG data of longitudinally "a00" through "a(n−1)0" and laterally "a00" through "a0(p−1)" MCUs is decompressed, and the pixels in the rotated MCUs are in the state of being arranged in the band memory B as illustrated in FIG. 8(e).

Each time the uncompressed image of a rotated one band is generated, the uncompressed image data of the rotated one band is output to the image processing unit 107 and printed by the printer unit 108. Therefore, since the band memory B for storing the uncompressed image data only requires the memory capacity that is capable of storing the uncompressed image data of one band, the memory capacity for storing the uncompressed image data of the entire image is not necessary. Therefore, even in the comparative example, the rotation processing of the input image by 90 degrees to the right can be performed with low memory usage.

In S710, whether or not the rotation processing of the input image is completed is determined. In a case of j≥m/p, it means that the rotation processing of the full surface of the image data of the input image is completed (YES in S710), and therefore the present flowchart is completed. If the processing is not completed (NO in S710), the processing returns to S702, so that the decompression processing on the JPEG data corresponding to the next one band is performed.

As explained above, also in the method of the comparative example, in a case where the input image is rotated by 90 degrees to the right to be output, outputting is possible with a band memory B whose memory capacity is less than a page memory that stores uncompressed image data of one page. Therefore, in a case of scanning a document in such an arrangement as in FIG. 2A, the processing of the comparative example can be directly applied for such rotation by 90 degrees to the right as in FIG. 2C.

However, in the case of such rotation by 90 degrees to the left (=rotation by 270 degrees to the right) as in FIG. 2B, there is a problem in the comparative example that the decompression processing cannot be performed if the decompression is to be performed from JPEG data corresponding to the top side in the longitudinal direction of the input image.

Figure 9:
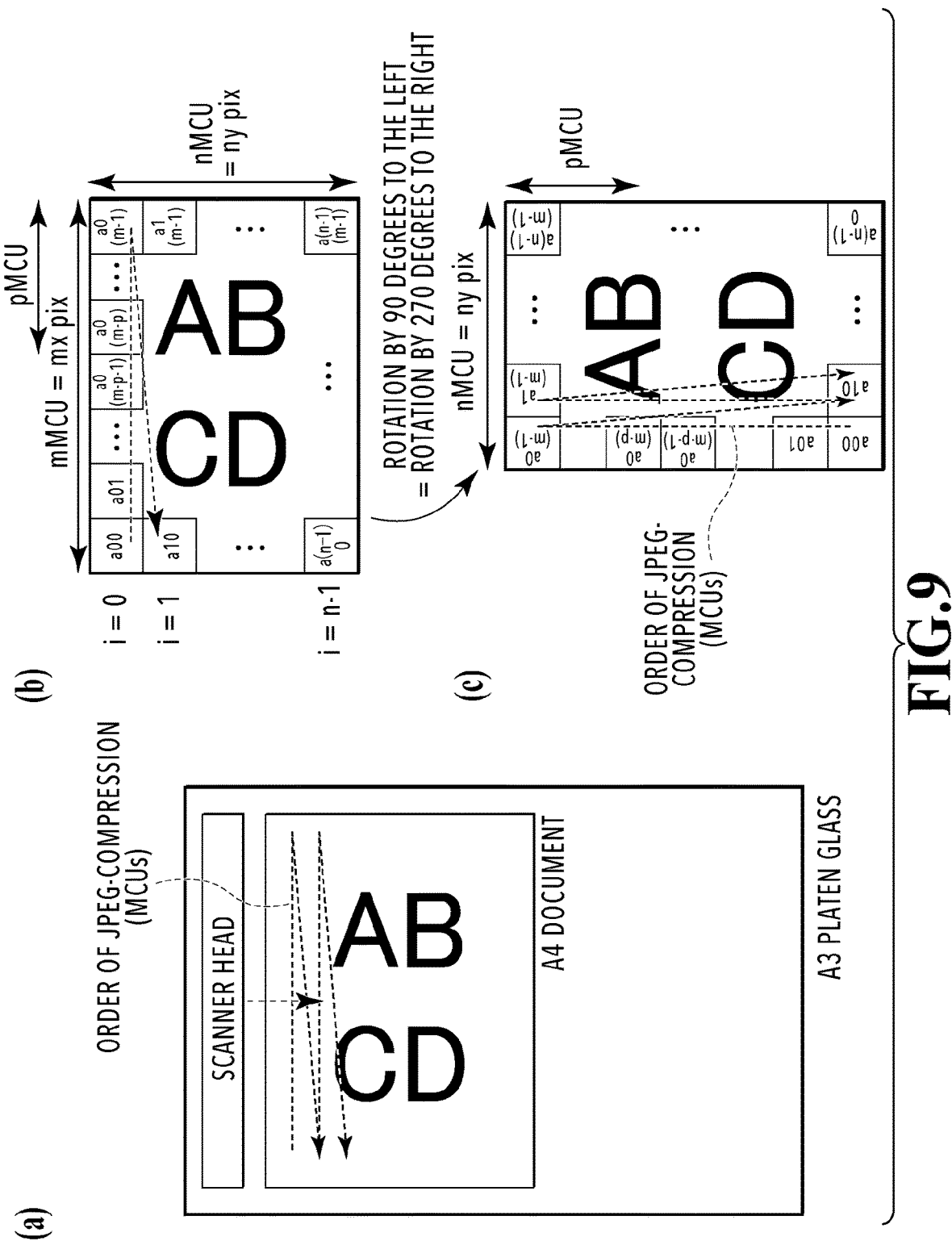
FIG. 9 is diagram for explaining compression and decompression processing in a case of rotation by 270 degrees to the right in the comparative example.

FIG. 9 is diagram for explaining the decompression processing for rotating an input image by 270 degrees to the right for output in a case where the compression was performed in the method of the comparative example. As illustrated in FIG. 9(a) and FIG. 9(b), in the comparative example, the compression processing on the input image is performed in raster order on a per MCU basis from the top leftmost MCU of the image. The MCUs in FIG. 9(b) and FIG. 9(c) are numbered in the order of compression to identify the MCUs in the same manner as in FIG. 5(a).

In order to decompress the JPEG data so as to be output from the top side of the rotated image, in a case of j=0 in FIG. 7, which is the processing of the first band, the JPEG data of "ai(m-p)" through "ai(m−1)" needs to be decompressed for the i-th MCU line.

As illustrated in FIG. 9(b), for example, in order to decompress the data in the "a0(m-p)" MCU, the start bit position and the direct-current component value obtained as a result of the decompression processing on the JPEG data in the "a0(m-p−1)" MCU, which is the MCU on which the compression processing was performed immediately before the "a0(m-p)" MCU, are necessary. However, since the "a0(m-p−1)" MCU is the MCU that is to be decompressed in the decompression of the next one band, it is not possible to obtain a result of the decompression processing on the "a0(m-p−1)" MCU. Therefore, in the comparative example, the start bit position and the direct-current component value of the MCU required for decompression of an MCU cannot be obtained if the decompression is to be performed from the JPEG data corresponding to the top side of the rotated image in a case where the image is rotated by 270 degrees to the right after compression of the input image.

Note that, as a method for performing rotation by 270 degrees to the right with a band memory, there may be a method in which the entire JPEG data is firstly decompressed, then only the output result of one band required for output is cutout, rotated, and output to the memory, and the other output results are deleted in the circuit without being output to the memory. However, in this method, it is necessary to decompress the entire JPEG data for the same number of times as the number of bands in the input image. Therefore, there is a problem that large amounts of processing time and memory bandwidth are required as compared with the processing of rotating the input image by 90 degrees to the right in the comparative example.

[The Compression Processing of the Present Embodiment]

If the input image is to be rotated by 270 degrees to the right for output in the method of the comparative example, it is necessary to perform the decompression processing for each MCU in the order opposite to the processing order of the JPEG-compression. As described above, since the decompression processing requires the result of decompression of the previous pixel, the rotation by 270 degrees is not possible in a memory usage saving manner in the method of the comparative example. Therefore, in the present embodiment, the processing order of compression is changed according to the rotational angle for output.

Figure 10:
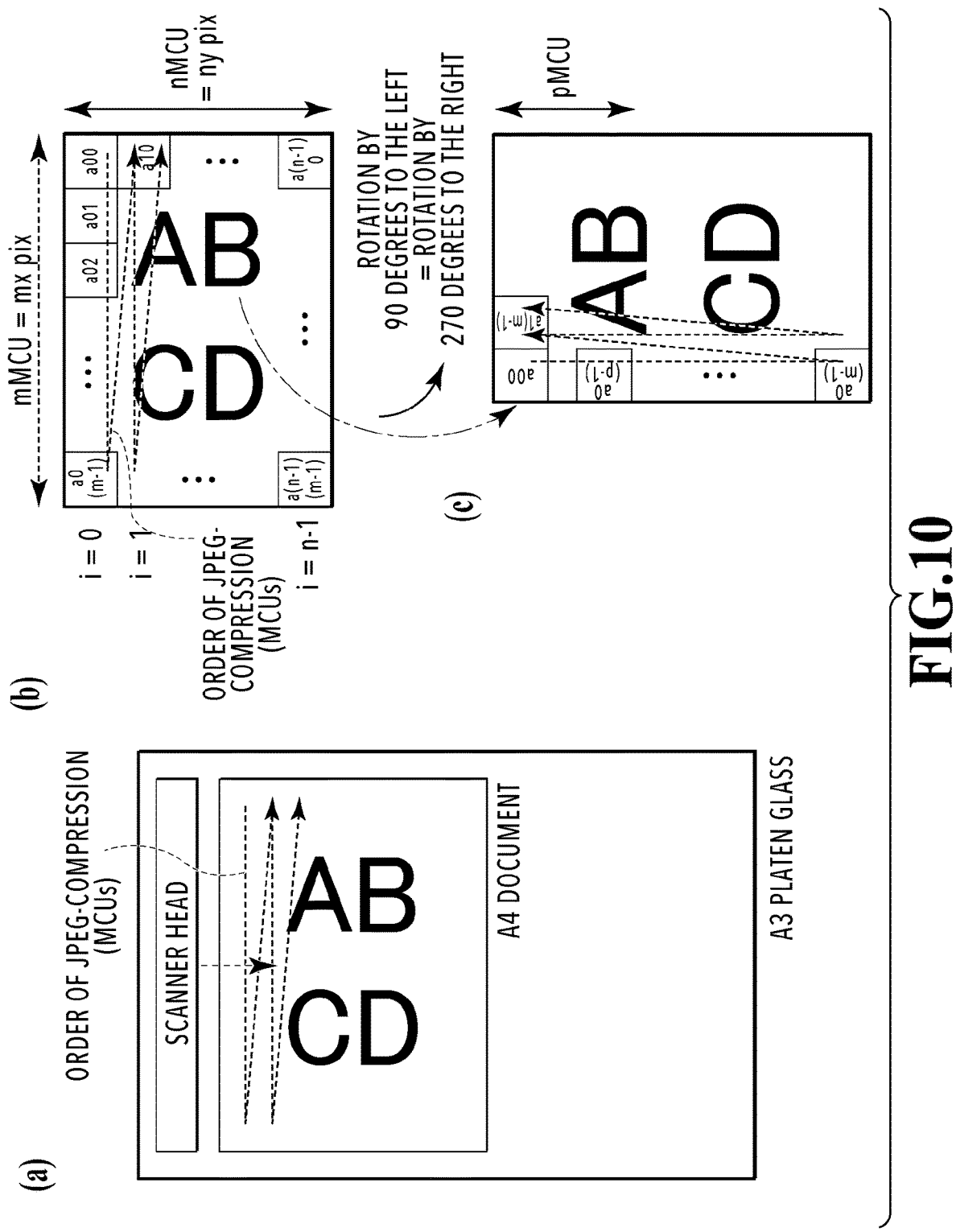
FIG. 10 is diagram for explaining compression and decompression processing in a case of rotation by 270 degrees to the right.

FIG. 10 is diagram for explaining a processing order of compressing an input image in the present embodiment. As illustrated in FIG. 10(a), in a case where the input image is rotated by 270 degrees to the right for output, the order of processing the MCUs in an MCU line is changed to a method in which the processing is sequentially performed from the end of the right side, which is opposite to the left side, to the MCUs on the left. By performing the compression processing in this method, it is possible to perform the process of rotating the input image by 270 degrees to the right at high speed and with reduced memory area usage.

In particular, the JPEG data created for printing is not output to the outside. Therefore, there are not many problems caused by performing the compression processing on the MCUs in the order of FIG. 10(a). The following explanation will be given of the compression processing of the present embodiment below.

First, an overview of the operation of the compression DMAC 104 will be explained. The uncompressed image data of the input image obtained by scanning a document with the scanner unit 102 is input to the memory 110 in raster order. The compression DMAC 104 obtains each pixel value in a per MCU basis so as to supply the image data that is input to the memory 110 to the JPEG compressor 103. The compression DMAC 104 consecutively outputs the JPEG data, which is obtained by compression performed by the JPEG compressor 103, to different addresses in the memory 110 in the order of the MCUs supplied to the JPEG compressor 103.

In the memory 110, respective 8-bit RGB pixel values are arranged from the start address SA in a pixel-interleaving manner in advance. As explained in FIG. 5, in a case where the lateral width of 1 MCU corresponds to x pixels and the longitudinal width corresponds to y lines and an input image is configured with laterally m and longitudinally n MCUs, the size of the input image corresponds to laterally mx and longitudinally ny pixels. In this case, the number of bytes in the lateral width of an MCU corresponds to 3x bytes.

Figure 11:
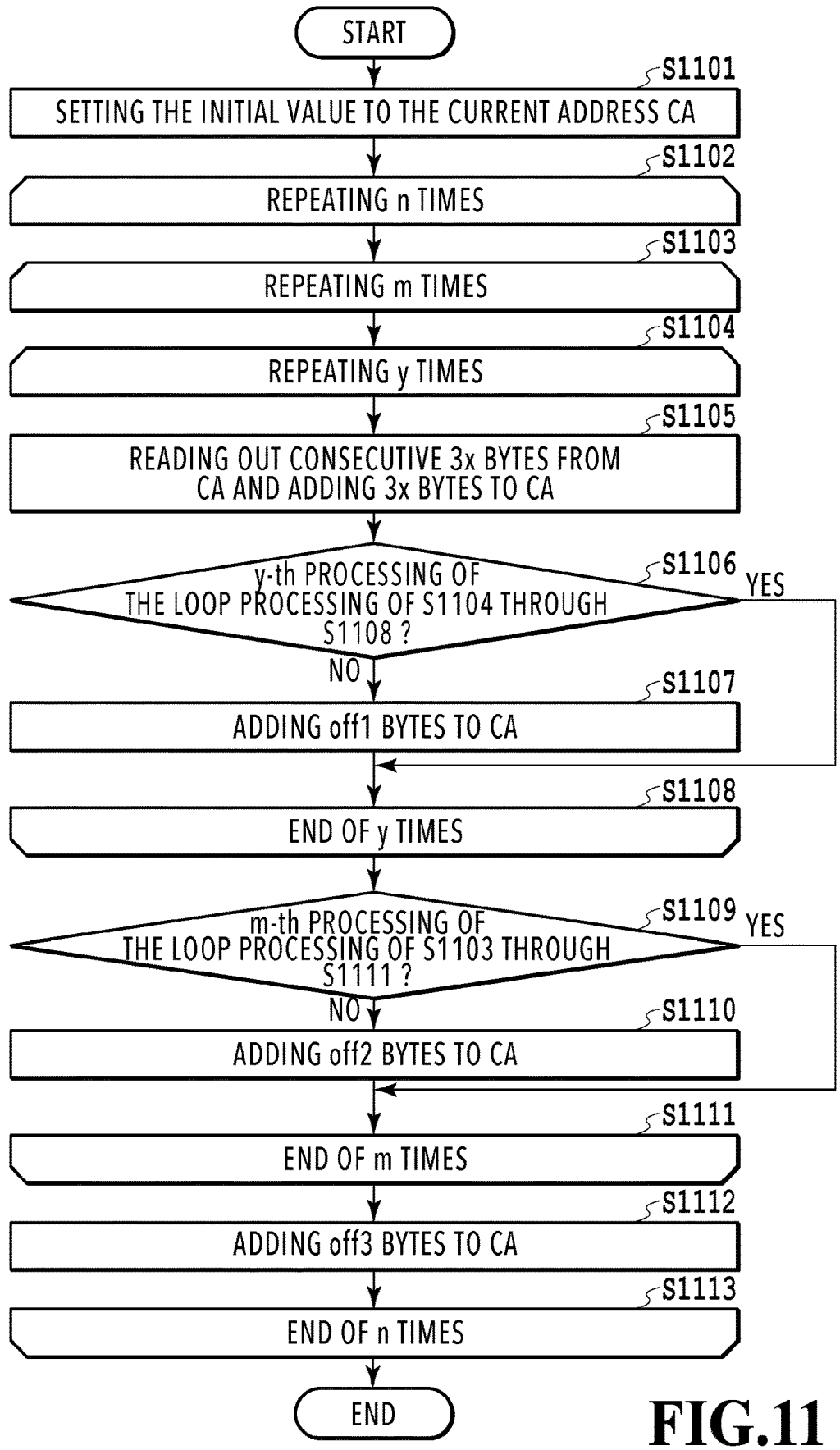
FIG. 11 is a flowchart for explaining compression processing.

FIG. 11 is a flowchart for explaining the operation of the compression DMAC 104 in the present embodiment for compression of JPEG data. First, the processing performed by the compression DMAC 104 of the present embodiment in a case where an input image is rotated by 90 degrees to the right for output will be explained.

Figures 12A, 12B:
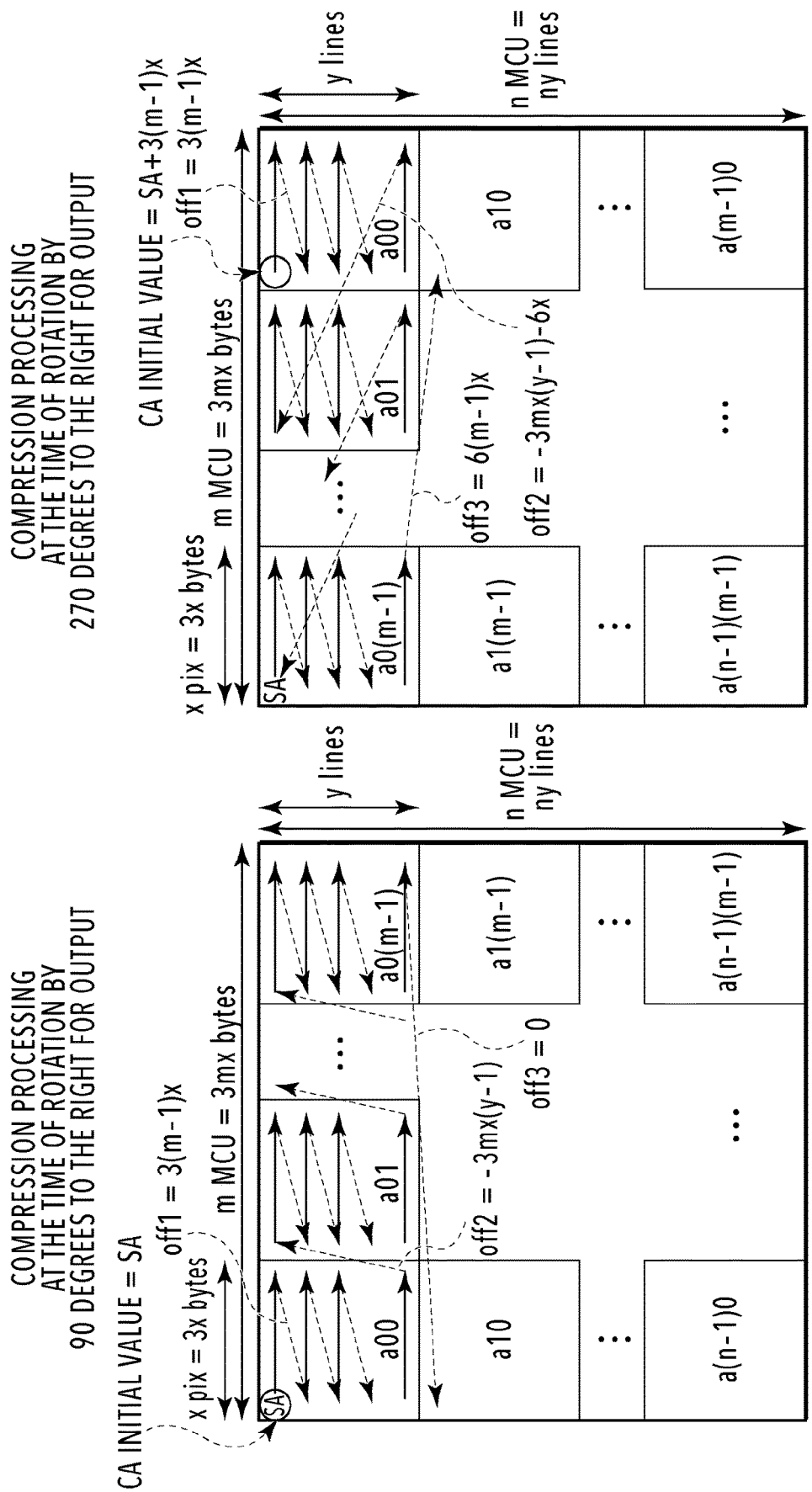
FIG. 12A and FIG. 12B are diagrams for explaining a processing order of compression processing in an image.

In S1101, the compression DMAC 104 sets the current address CA to SA (CA=SA) and starts processing. FIG. 12A and FIG. 12B are diagrams for explaining the compression processing of the present embodiment. FIG. 12A is a diagram for explaining the order of the JPEG-compression in a case where rotation by 90 degrees to the right is performed for output. As illustrated in FIG. 12A, the following explanation will be given on the premise that the position of the input image indicated by SA is the top leftmost pixel of the image.

Next, the loop processing of S1104 through S1108 in which the processes of S1105 through S1107 are repeated y times will be explained. In S1105, the compression DMAC 104 reads out consecutive 3x-byte image data of the input image starting from the current address CA and supplies the consecutive 3x-byte image data to the JPEG compressor 103. After reading it out, 3x bytes, which correspond to the number of read-out bytes, are added to the current address CA to update CA.

In S1106, whether or not the present processing is the y-th processing of the loop processing of S1104 through S1108 is determined.

In a case of not the y-th processing (NO in S1106), in S1107, the compression DMAC 104 adds off1 bytes to the current address CA of the start timing of the present step to update CA. In a case of rotation by 90 degrees to the right, off1 is equal to 3(m−1)x. As illustrated in FIG. 12A, by adding off1 bytes, the position of the input image indicated by the current address CA moves to the leftmost pixel of the next line in the same MCU.

In the case of the y-th processing (YES in S1106), S1107 is skipped and the loop processing of S1104 through S1108 ends. By performing this loop processing of S1104 through S1108, the image data of the input image of 1 MCU is supplied to the JPEG compressor 103. The JPEG compressor 103 consecutively performs JPEG-compression processing on input MCUs. At this point in time, the position in the image indicated by the current address CA corresponds to the next pixel of the bottom rightmost pixel of the MCU.

Next, the loop processing of S1103 through S1111 in which the processes of S1104 through S1110 are repeated m times will be explained.

After the end of the loop processing of S1104 through S1108 described above, whether the processing is the m-th processing of the loop processing of S1103 through S1111 is determined in S1109.

In a case of not the m-th processing (NO in S1109), in S1110, the compression DMAC 104 adds off2 bytes to the current address CA to update CA. In a case of rotation by 90 degrees to the right, off2 is equal to −3mx(y−1). By adding off2 bytes, the position in the input image indicated by the current address CA moves to the top leftmost pixel in the adjacent MCU on the right side, as illustrated in FIG. 12A.

In the case of the m-th processing (YES in S1109), S1110 is skipped and the loop processing of S1103 through S1111 ends. By performing this loop processing of S1103 through S1111, the data of 1 MCU line of the input image is input to the JPEG compressor 103. Therefore, at this point in time, the data in the memory area in which the uncompressed image of 1 MCU line of the input image that has been compressed so far can be deleted so that the memory area is made available. Here, in a case where the image data of the next MCU line of the input image has not been obtained and is not in the memory 110, the processing is suspended until the image data of the input image is stored in the memory and then proceeds to the next process.

Next, the loop processing of S1102 through S1113 in which the processes of S1103 through S1112 are repeated n times will be explained. In the loop processing of S1102 through S1113, after the end of the loop processing of S1103 through S1111 described above, the compression DMAC 104 adds off3 bytes to the current address CA in S1112 to update CA.

In a case where the image data of the input image of the next 1 MCU line is consecutively stored in the memory area with the image data of the input image of the previous 1 MCU line, off3 is equal to 0. In a case where the input image of the next 1 MCU line is stored in a new memory area, off3 is equal to "start address of the memory area"-CA. By adding off3 bytes, the position in the input image indicated by the current address CA moves to the top leftmost pixel of the leftmost MCU in the immediately-below MCU line, as illustrated in FIG. 12A.

By performing this loop processing of S1102 through S1113, the image data of n MCU lines, that is, the image data of the entire input image, is input to the JPEG compressor 103, and the JPEG data of the input image is generated in the memory.

Next, the operation of the compression DMAC 104 for decompression output with rotation by 270 degrees to the right will be explained with reference to the flowchart of FIG. 11. The difference from the processing in a case of rotation by 90 degrees to the right is that the values to be added to CA are different. Therefore, the difference from the decompression output with rotation by 90 degrees to the right will be mainly explained.

In S1101, the compression DMAC 104 sets the current address CA to SA+3(m−1)x and starts processing. FIG. 12B is a diagram for explaining the order of the JPEG-compression in a case where rotation by 270 degrees to the right is performed. As illustrated in FIG. 12B, the position in the input image indicated by CA after the process of the present step moves to the top leftmost pixel in the top rightmost MCU of the input image.

In S1105, the compression DMAC 104 reads out consecutive 3x bytes starting from the current address CA. After reading it out, the read-out 3x bytes are added to the current address CA to update CA.

In S1107, the compression DMAC 104 adds off1 bytes to the current address CA of the start timing of the present step to update CA. Also in a case of rotation by 270 degrees, off1 is equal to 3(m−1)x. By adding off1, the position in the image indicated by the current address CA moves to the leftmost pixel of the next line in the same MCU, as illustrated in FIG. 12B.

By performing the loop processing of S1104 through S1108, the input image data of 1 MCU is supplied to the JPEG compressor 103.

In S1110, the compression DMAC 104 adds off2 bytes to the current address CA of the start timing of the present step to update CA. However, in a case of rotation by 270 degrees, off2 is equal to $-3mx(y-1)-6x$. By adding off2 bytes, the position in the image indicated by the current address CA moves from the bottom rightmost pixel in the MCU to the top leftmost pixel of the adjacent MCU on the left side, as illustrated in FIG. 12B.

By performing the loop processing of S1103 through S1111, the data of 1 MCU line of the input image is input to the JPEG compressor 103 in the order of MCUs from the right to the left, which is opposite to that in the case of rotation by 90 degrees to the right.

In S1110, the compression DMAC 104 adds off3 bytes to the current address CA of the processing timing of the present step to update CA. In a case where the input uncompressed image of the next 1 MCU line is consecutively stored in the memory area with the uncompressed image of the previous 1 MCU line, off3 is equal to $6(m-1)x$. In a case of being stored in a new memory area, off3 is equal to "start address of the memory area"-CA+$3(m-1)x$. That is, by adding off3 bytes, the position in the image indicated by the current address CA moves to the top leftmost pixel in the rightmost MCU of the next MCU line, as illustrated in FIG. 12B.

By performing the loop processing of S1102 through S1113, the entire input image is input to the JPEG compressor 103.

[About the Decompression Processing of the Present Embodiment]

The JPEG data in a case of performing rotation by 270 degrees to the right for output is generated by the flowchart of FIG. 11 in a compression order that is different from the compression order of MCUs for normal JPEG-compression, which is explained in the compression processing of the comparative example. Further, a general JPEG decoder performs decompression processing of JPEG data on the premise of the compression order of MCUs for normal JPEG-compression as explained in the decompression processing of the comparative example. Therefore, the JPEG data to be rotated by 270 degrees to the right, which is generated by the flowchart of FIG. 11, cannot be correctly output as an image by a general JPEG decoder.

In the present embodiment, the JPEG decompressor 105 and the decompression DMAC 106 perform a process of decompressing the JPEG data rotated by 270 degrees to the right, which is generated based on the flowchart of FIG. 11, in order to properly output an image.

First, as with the comparative example, the decompression DMAC 106 performs the empty decoding processing according to the flow of FIG. 6 in the present embodiment as well. In the flowchart of FIG. 6, it is necessary to obtain the start bit position of the iMCU line in the JPEG data and the direct-current component value at the start of the iMCU line. Therefore, in the empty decoding processing of FIG. 6, which is performed by the decompression DMAC 106 of the present embodiment, in the case of JPEG data generated to be rotated by 90 degrees to the right for output, the "first MCU" of the iMCU line is the leftmost MCU of the iMCU line in the input image. On the other hand, in the case of JPEG data generated to be rotated by 270 degrees to the right for output, the "first MCU" of the iMCU line is the rightmost MCU of the iMCU line in the input image.

By executing the flowchart of FIG. 6, the start bit position addr[i] in the iMCU line of the JPEG data and the direct-current component value dc[i][k] (k=0, 1, 2) at the start of the iMCU line can be obtained.

Next, the overview of the operation of the decompression DMAC 106 and the JPEG decompressor 105 in the decompression processing for outputting an image of the present embodiment will be explained. The operation of the decompression DMAC 106 is opposite to that of the compression DMAC 104. That is, the decompression DMAC 106 consecutively obtains JPEG data from the designated addresses in the memory 110 and supplies the JPEG data to the JPEG decompressor 105. The JPEG decompressor 105 has an internal memory that can store and rotate decompressed image data of one MCU. The JPEG decompressor 105 performs decompression processing on the supplied JPEG data on a per MCU basis and stores the JPEG data in the internal memory, and then outputs the uncompressed image rotated by the rotational angle for output (90 degrees to the right or 270 degrees to the right) to the decompression DMAC 106 in raster order in the MCU. The decompression DMAC 106 stores the obtained uncompressed image data of each MCU at a predetermined address in the memory 110, which is determined by the flow illustrated in FIG. 15, for output in which pixel values are arranged in predetermined pixels in the image.

Figure 13:
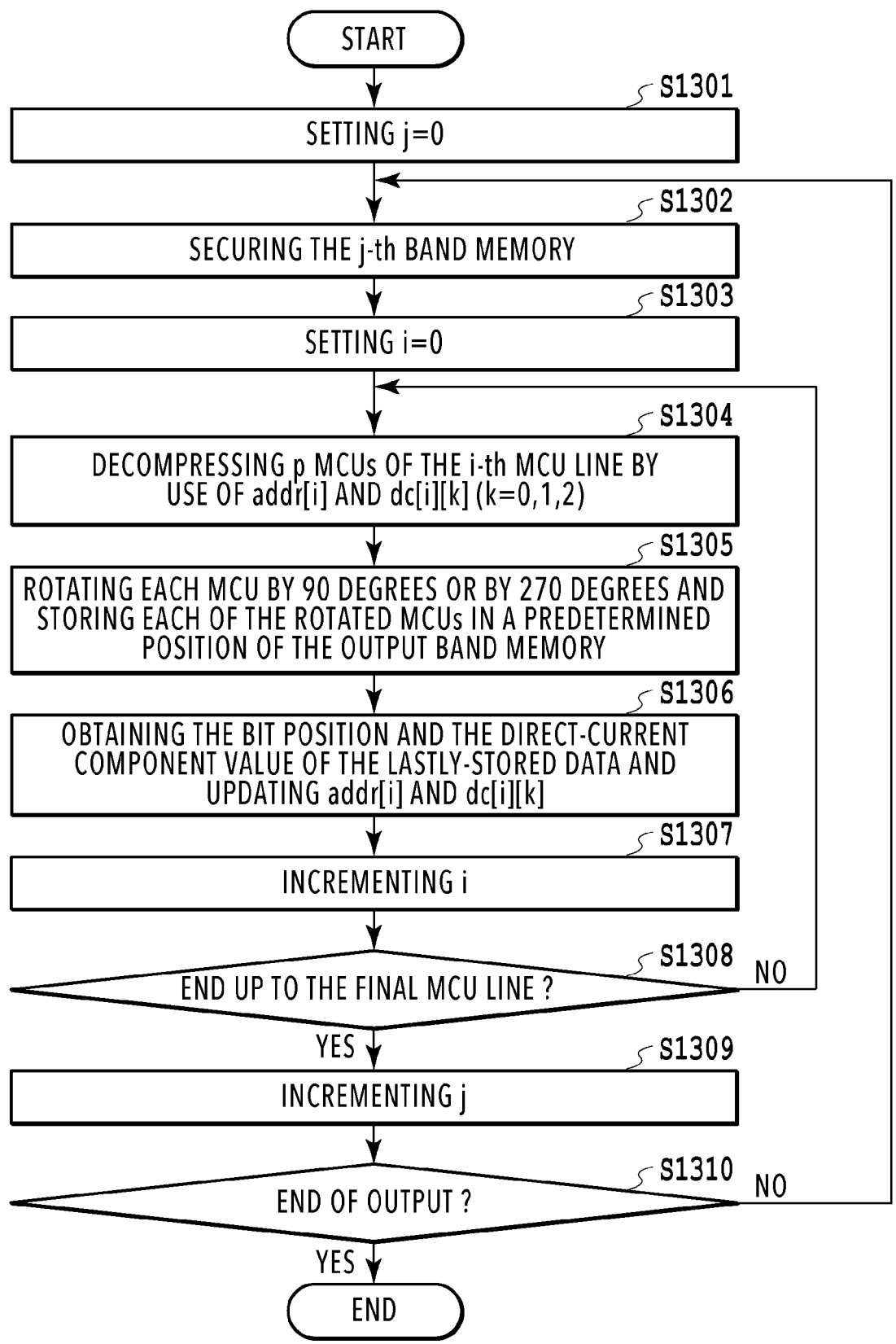
FIG. 13 is a flowchart for explaining decompression processing for outputting an image.

FIG. 13 is a flowchart for explaining the decompression processing for outputting an image of the present embodiment, which is performed by the JPEG decompressor 105 and the decompression DMAC 106. The processing of the flowchart of FIG. 13 is similar to the processing of the flowchart of FIG. 7 of the comparative example.

First, a case in which the input image is rotated by 270 degrees to the right for output will be explained. The processing of S1301 through S1303 is the same as the processing of S701 through S703. Note that, in S1302, a band memory B in a size of 3nypx bytes (note that p is an integer smaller than m), which is capable of storing uncompressed image data of one band, is secured in the memory 110. Further, the head address of the band memory B is referred to as SA. In a case where j is equal to or greater than 1 j≥1), S1302 will be suspended until the band memory B is made available.

Figure 14:
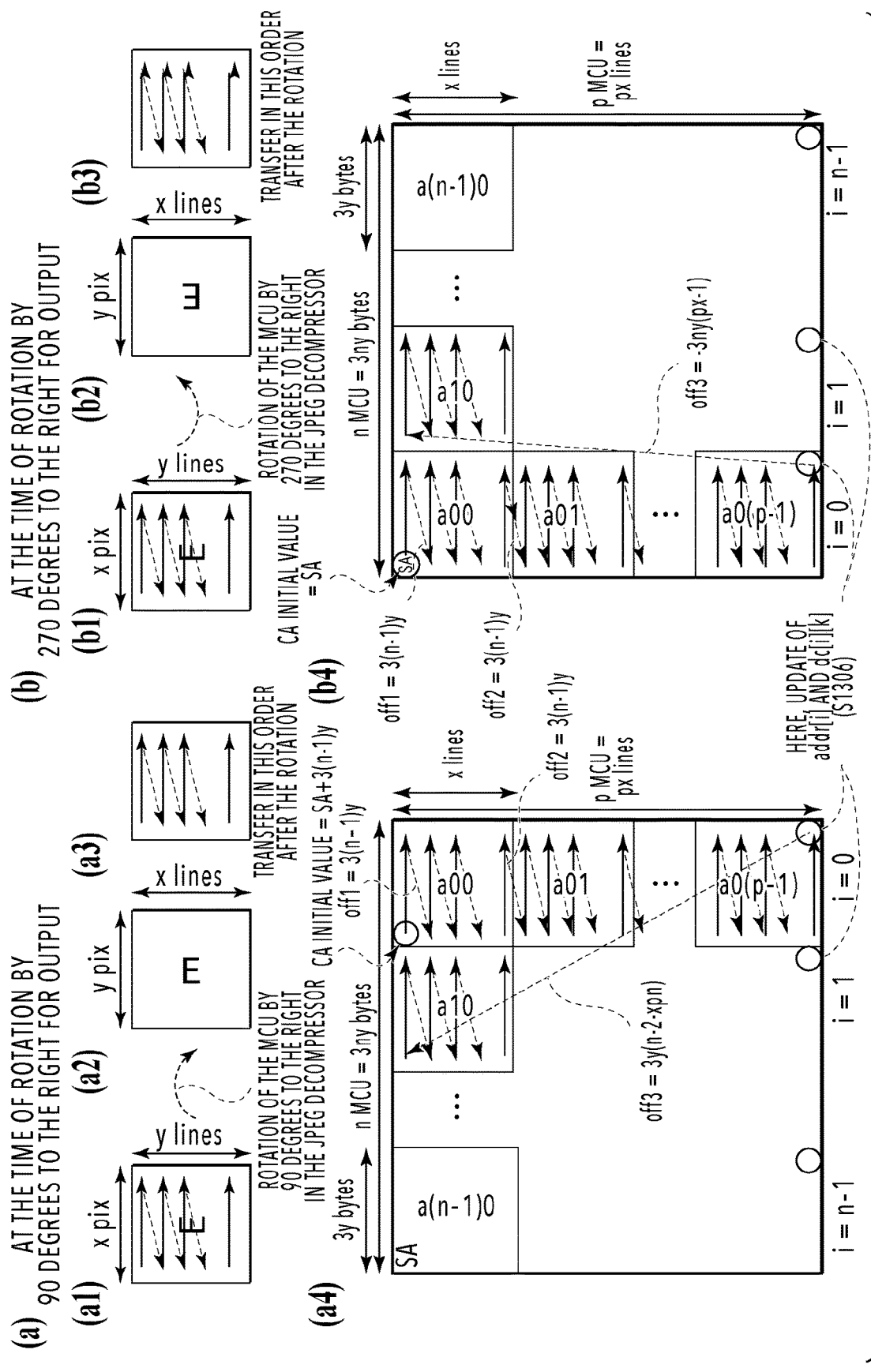
FIG. 14 is diagram for explaining arrangement locations in an image for data on which decompression processing has been performed.

FIG. 14 is diagram for explaining the decompression processing of the present embodiment. FIG. 14(a1) through FIG. 14(a4) are diagrams for explaining the position of an output image indicated by an address of the band memory B in a case where an input image is rotated by 90 degrees to the right for output. FIG. 14(b1) through FIG. 14(b4) are diagrams for explaining the position of an output image indicated by an address of the band memory B in a case where an input image is rotated by 270 degrees to the right for output. As illustrated in FIG. 14(a4) and FIG. 14(b4), the following explanation will be given on the premise that the position in the output image indicated by SA is the top leftmost pixel.

In S1304, the decompression DMAC 106 consecutively supplies the JPEG data of the iMCU line from the start bit position addr[i] to the JPEG decompressor 105. The JPEG decompressor 105 decompresses the compressed data corresponding to p MCUs from the start bit position. In a case of j=0, addr[i] is the start bit position obtained by the empty decoding processing of FIG. 6.

In S1305, the JPEG decompressor 105 rotates the data (uncompressed image data) obtained by decompressing the JEPG data by 270 degrees to the right on a per MCU basis and outputs the data to the decompression DMAC 106. The decompression DMAC 106 stores the uncompressed image data in the rotated MCU at a predetermined address of the band memory B.

Note that, in S1304 to S1305, each time processing for 1 MCU is performed, the processing processes to S1305, so as to process the data in the MCU on which the decompression processing has been performed. In this way, the rotated uncompressed image data in p MCUs is written in the band memory B.

The processes of S1304 and S1305 will be explained with reference to FIG. 14(b1) through FIG. 14(b4), focusing on the processing of JPEG data of 1 MCU, which is performed by the JPEG decompressor 105. As illustrated in FIG. 14(b1), the uncompressed image data of 1 MCU, which is obtained as a result of decompression, is output in raster order to the internal memory of the JPEG decompressor 105. Then, as illustrated in FIG. 14(b2), after the uncompressed image data of an MCU is rotated by 270 degrees to the right, the uncompressed image data of the rotated MCU is output in raster order to the decompression DMAC 106 as illustrated in FIG. 14(b3). The decompression DMAC 106 writes the rotated uncompressed image data to a predetermined address of the band memory B, which is determined according to the flowchart illustrated in FIG. 15. Note that the order of rotation and decompression may be reversed.

Figure 15:
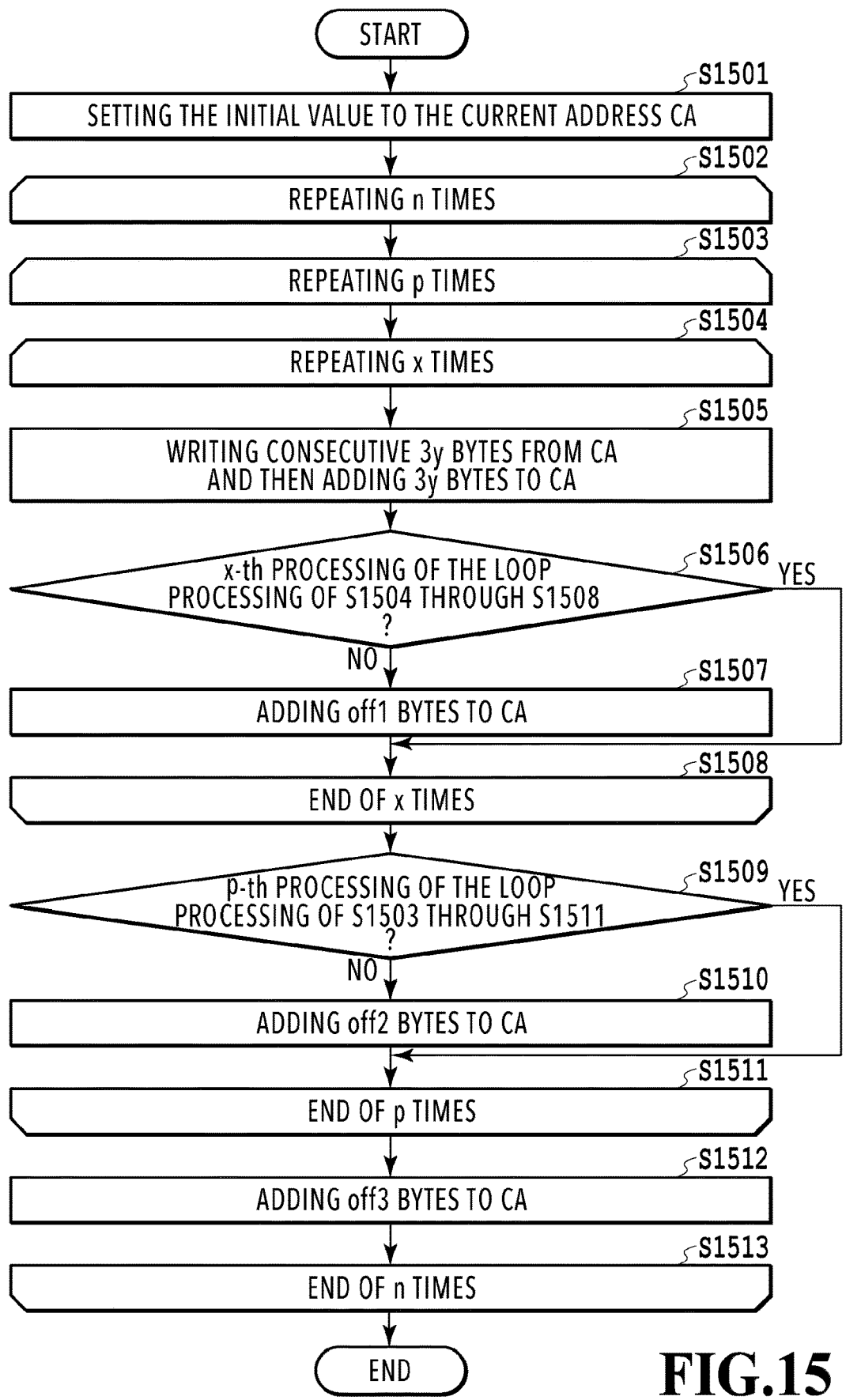
FIG. 15 is a flowchart for determining addresses for storing data on which decompression processing has been performed.

FIG. 15 is a flowchart for determining an address of the band memory B for writing the uncompressed image data obtained by decompression, which is performed by the decompression DMAC 106 and the JPEG decompressor 105. First, the case of rotation by 270 degrees to the right will be explained.

In S1501, the decompression DMAC 106 sets the initial value to the current address CA.

In the case where the rotational angle is 270 degrees to the right, the initial value is SA.

Next, the loop processing of S1504 through S1508 in which the processes of S1505 through S1507 are repeated x times will be explained. After S1501, in S1305 of FIG. 13, the uncompressed image data of 3y bytes, which is output from the JPEG decompressor 105 in raster order in the MCU, is consecutively written from the current address CA of the band memory B. In S1505, in a case where 3y bytes are written in the band memory B, the decompression DMAC 106 adds 3y bytes to CA to update CA.

In S1506, whether the present processing is the x-th processing of the loop processing of S1504 through S1508 is determined.

In a case of not the x-th processing (NO in S1506), in S1507, the decompression DMAC 106 adds off1 bytes to the current address CA of the start timing of the present step to update CA. In a case where the rotational angle is 270 degrees to the right, off1 is equal to 3(n−1)y. As illustrated in FIG. 14(b4), by adding off1 bytes, the position in the image indicated by the current address CA moves to the leftmost pixel of the next line in the same MCU.

In the case of the x-th processing (YES in S1506), S1507 is skipped and the loop processing of S1504 through S1508 ends. At the point in time where the loop processing of S1504 through S1508 ends, the uncompressed image data of 1 MCU is written in the band memory B. At this point in time, the position in the image indicated by the current address CA moves to the pixel on the right of the bottom rightmost pixel of the MCU whose data has been stored.

Next, the loop processing of S1503 through S1511 in which the processes of S1504 through S1510 of FIG. 15 are repeated p times will be explained. After the end of the loop processing of S1504 through S1508 described above, whether the present processing is the p-th processing of the loop processing of S1503 through S1511 is determined in S1509.

In a case of not the p-th processing (NO in S1509), in S1510, the decompression DMAC 106 adds off2 bytes to the current address CA to update CA. In a case where the rotational angle is 270 degrees to the right, off2 is equal to 3(n−1)y. As a result of the processing of the present step, the position in the image indicated by the current address CA moves to the top leftmost pixel of the immediately-below MCU as illustrated in FIG. 14(b4).

In the case of the p-th processing (YES in S1509), S1510 is skipped and the loop processing of S1503 through S1511 ends. At the point in time where the loop processing of S1503 through 1511 ends, the data of p consecutive MCUs in 1 MCU line of the input image is output from the JPEG decompressor 105 and written in the band memory B.

At the point in time where the data of p consecutive MCUs in one MCU line is output from the JPEG decompressor 105 and written in the band memory B, the processing in the flowchart of FIG. 13 proceeds to S1306. S1306 is the same process as S706, so that the decompression DMAC 106 updates the start bit position addr[i] and the direct-current component value dc[i][k] (k=0, 1, 2) in the iMCU line at the point in time of the process of S1306. These values are utilized in the processing of the next 1 band after incrementing j.

Next, the loop processing of S1502 through S1513 in which the processes of S1503 through S1512 are repeated n times in the flowchart of FIG. 15 will be explained. In the loop processing of S1502 through S1513, after the end of the loop processing of S1503 through S1511 described above, the decompression DMAC 106 adds off3 bytes to the current address CA in S1512 to update CA. In a case where the rotational angle is 270 degrees to the right, off3 is equal to −3ny(px−1). As a result of the processing of the present step, the position in the image indicated by the address of the current address CA moves to the top leftmost pixel of the top MCU in the adjacent column on the right side as illustrated in FIG. 14(b4). On the other hand, at the point in time of S1512, the decompression DMAC 106 increments i in S1307 of FIG. 13.

At the point in time where this loop processing of S1502 through S1513 ends, the image of one band having the width of laterally p MCUs in the input image is rotated by 270 degrees to the right and output to the band memory B. Further, at this point in time, it is determined in S1308 of the flowchart of FIG. 13 to be YES.

In S1309 of FIG. 13, j is incremented. Then, if there is JPEG data corresponding to the next band of the input image (NO in S1310), the processing returns to S1302. In that case, the processing will be performed again from S1501 in the flowchart of FIG. 15. In the processing after incrementing j, if the head MCU of an MCU line is the 0th MCU, the decompression processing is to be performed on the JPEG data of 1 band that is configured with n MCU lines each having p MCUs from the jp-th to the (1+j)p-lth MCUs.

If there is no JPEG data corresponding to the next 1 band of the input image (YES in S1310), it means that the entire input image is rotated and output, and therefore the processing ends.

Next, the following explanation will be given of the processing of the flowcharts of FIG. 13 and FIG. 15 in a case where the rotational angle for output is 90 degrees to the right. The main difference of the processing from the case of rotation by 270 degrees to the right is that the rotational angle for decompression is different in FIG. 13 and the values to be added to CA are different in FIG. 15. Therefore, the difference from the decompression output with rotation by 270 degrees to the right will be mainly explained.

The processes of S1304 and S1305 will be explained with reference to FIG. 14(a1). The uncompressed image data in 1 MCU, which is obtained as a result of decompression, is output in raster order to the internal memory of the JPEG decompressor 105. Then, as illustrated in FIG. 14(a2), after the uncompressed image data in 1 MCU is rotated by 90 degrees to the right, the data in the rotated MCU is output in raster order to the decompression DMAC 106 as illustrated in FIG. 14(a3).

In S1305, the JPEG decompressor 105 rotates the data, on which the decompression processing has been performed, by 90 degrees to the right on a per MCU basis and outputs the data to the decompression DMAC 106. The decompression DMAC 106 stores the data in the rotated MCU at a predetermined address of the band memory B.

In S1501 of the flowchart of FIG. 15, the decompression DMAC 106 sets the initial value to the current address CA. In the case where the rotational angle is 90 degrees to the right, the initial value is SA+3(n−1)y. As illustrated in FIG. 14(a4), the position in the image indicated by the current address CA is the top leftmost pixel in the top rightmost MCU.

In S1507, the decompression DMAC 106 adds the value of off1 bytes to the current address CA of the start timing of the present step to update CA. In a case where the rotational angle is 90 degrees to the right, off1 is equal to 3(n−1)y, which is the same as the case of 270 degrees. As illustrated in FIG. 14(a4), by adding off1 bytes, the position in the image indicated by the current address CA moves to the leftmost pixel of the next line in the same MCU.

In S1510, the decompression DMAC 106 adds the value of off2 bytes to the current address CA to update CA. In a case where the rotational angle is 90 degrees to the right, off2 is equal to 3(n−1)y, which is the same as the case of 270 degrees. As a result of the processing of the present step, the position in the image indicated by the current address CA moves to the top leftmost pixel in the immediately-below MCU as illustrated in FIG. 14(a4).

In S1512, the decompression DMAC 106 adds the value of off3 bytes to the current address CA to update CA. In a case where the rotational angle is 90 degrees to the right, off3 is equal to 3y(n−2-xpn). As a result of the processing of the present step, the position in the image indicated by the current address CA moves to the top leftmost pixel in the top MCU in the next column on the left side as illustrated in FIG. 14(a4).

As described above, in the decompression processing of the present embodiment, the processing is performed until it is determined that the processing of FIG. 13 has been performed up to the final MCU line in the determination of S1308 and, as for the processing of FIG. 15, the processing is performed until the loop processing of S1502 through S1513 ends. By processing in this way, an uncompressed image of 1 band having the width of laterally p MCUs in the input image is generated in the band memory B in a state of being rotated by 90 degrees or 270 degrees to the right. Based on the image stored in the band memory B at that point in time, printing is performed by the printer unit 108 Thereafter, the band memory B is made available, and, in the flowchart of FIG. 13, j is incremented and the processing returns to S1302. By starting the processing again from S1501 in the flowchart of FIG. 15, the uncompressed image of the next 1 band having the width of laterally p MCUs is generated in the band memory B in a state of being rotated by 90 degrees or 270 degrees to the right.

In the present embodiment, the order of compressing the input image in a case where the JPEG data is rotated by 270 degrees to the right at the time of decompression for output is made to be different from the order of compressing the input image in a case where the JPEG data is rotated by 90 degrees to the right at the time of decompression for output. By doing so, even in a case where the input image is rotated by 270 degrees to the right for output, outputting from the top-side band of the rotated image is possible. Therefore, the input image can be rotated by 90 degrees to the right or by 270 degrees to the right for output only with the memory capacity in the size of the sum of the memory capacity capable of storing the JPEG data of the entire input image and the memory capacity of the band memory B. That is, the capacity of the band memory B is 3pnxy bytes capable of storing an image of 1 band and is smaller than the page memory of 3mnxy bytes capable of storing an uncompressed input image. Therefore, it is possible to perform the processing of rotating the input image by 270 degrees to the right for output with low memory usage.

Further, in the present embodiment, in a case where it is necessary to utilize both of the processing for rotation by 90 degrees to the right and rotation by 270 degrees to the right in the same apparatus, both of the rotation processing of 90 degrees to the right and 270 degrees to the right can be performed with low memory usage by using different pixel processing orders for compression according to the rotational angles.

For example, in such a recording apparatus capable of performing double-side printing with a mechanism capable of performing switchback operation as illustrated in FIG. 3A through FIG. 3D, under a setting of the double-side printing, in a case where rotation by 270 degrees to the right is performed for printing on the front surface of the printing paper, it is necessary to perform rotation by 90 degrees to the right for printing on the back surface thereof. In such a recording apparatus, printing is performed alternately on the front of the printing paper and the back of the printing paper in the order of scanning the documents. Therefore, in a case of printing on one surface (for example, the front surface) of the printing paper, the compression DMAC 104 and the decompression DMAC 106 can be made to operate under the control for the case in which the input image is rotated 90 by degrees to the right for output. Further, in a case of printing on the other surface (for example, the back surface) of the printing paper, the compression DMAC 104 and the decompression DMAC 106 can be made to operate under the control for the case in which the input image is rotated 270 by degrees to the right for output.

For example, under the setting of double-side printing, it is also possible to control the compression DMAC 104 and the decompression DMAC 106 so as to perform compression and decompression for rotation by 270 degrees to the right on odd-numbered pages of the input image obtained by scanning and perform compression and decompression for rotation by 90 degrees to the right on even-numbered pages thereof. Contrarily, it is also possible to control the compression DMAC 104 and the decompression DMAC 106 so as to perform compression and decompression for rotation by 90 degrees to the right on odd-numbered pages of the input image and to perform compression and decompression for rotation by 270 degrees to the right on even-numbered pages thereof.

In addition, for example, page aggregation (N-in-1) setting may be available in some recording apparatuses. For example, there is 2-in-1 setting for printing two pages on one sheet. In a case where double-side printing is performed in 2-in-1 setting on the (n+1)th printing paper, the (4n+1)th page of the input image is printed on the front surface and the (4n+2)th page thereof is printed on the front surface. Further, the (4n+3)th page of the input image is printed on the back surface of the printing paper and the (4n+4)th page thereof is printed on the back surface in that order by such a recording apparatus that performs 2-in-1 on both surfaces of printing paper for four pages of an input image. Also in this case, the compression DMAC 104 and the decompression DMAC 106 can be controlled in accordance with whether the input image is printed on the back surface or the front surface of the printing paper.

However, there is a case in which the rotational angle for printing is unknown at the timing of scanning a document. For example, there is a recording apparatus having a mode for such operation as determining whether or not the result of scanning each page of a document is a white page so as not to print a white page and to print the next non-white page continuously. In a recording apparatus operating in such a mode, during double-side printing, it is not necessary to control the compression DMAC 104 and the decompression DMAC 106 according to whether the back surface or the front surface of the printing paper or whether an odd-numbered page or an even-numbered page of the input image.

Further, there may be a recording apparatus that has a function of obtaining JPEG data from an external apparatus for printing. In that case, there is a case in which application of the decompression processing for rotation by 270 degrees to the right according to the flowcharts of FIG. 13 and FIG. 15 in the present embodiment is not preferable since the JPEG data obtained from an external apparatus may be in a state where the MCUs are compressed in raster order as in the comparative example. Therefore, in a case of rotating JPEG data obtained from an external apparatus by 270 degrees to the right for output, it is also possible for the recording apparatus 100 to perform decompression in another method, not the processing in the case of performing rotation by 270 degrees to the right in the decompression processing of FIG. 13 and FIG. 15, which is the method of the decompression processing in the present embodiment. For example, in a case of rotating JPEG data obtained from an external apparatus by 270 degrees to the right for output, it is also possible to control the decompression DMAC 106 so as to perform decompression in the same method as in the case of performing rotation by 90 degrees to the right for output.

As explained above, according to the present embodiment, even in a case where the input image is rotated by 270 degrees to the right for output, the rotation processing of 270 degrees to the right can be performed with a memory having a capacity that is smaller than the memory capable of storing the uncompressed input image.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-063577, filed Mar. 31, 2020, which is hereby incorporated by reference wherein in its entirety.

What is claimed is:

1. An image processing apparatus capable of rotating an input image for output, the image processing apparatus comprising:
   at least one processor; and
   a memory storing instructions to cause the at least one processor to function as:
   an obtaining unit configured to obtain image data of a rectangle area of the input image in an order from a rectangle line at a head of a longitudinal direction, the rectangle area being a unit for compression processing, the input image being configured such that the rectangle line configured with respective rectangle areas arranged from a front edge to a rear edge in a lateral direction is arranged in the longitudinal direction that intersects with the lateral direction;
   a compression unit configured to perform the compression processing for compressing the image data on a per rectangle area basis from the rectangle area at the front edge to the rectangle area at the rear edge of the rectangle line on a per rectangle line basis in order to generate compressed data of the input image in a case where the input image is rotated by a predetermined angle in a first direction for output so that the rectangle area at the front edge in the rectangle line at the head of the input image is positioned at a head of a longitudinal direction of a rotated image; and
   a decompression unit configured to decompress, rotate, and arrange the compressed data corresponding to the respective rectangle areas, in order to output an image,
   wherein, in a case where the input image is rotated by the predetermined angle in a direction opposite to the first direction for output, the compression unit compresses the image data on a per rectangle area basis from the rectangle area at the rear edge to the rectangle area at the front edge of the rectangle line.

2. The image processing apparatus according to claim 1,
wherein, in a case where the input image is rotated by 90 degrees to a right for output, the decompression unit decompresses the compressed data corresponding to the respective rectangle areas in an order from the rectangle area at the front edge to the rectangle area at the rear edge of the rectangle line, and wherein, in a case where the input image is rotated by 270 degrees to the right for output, the decompression unit decompresses the compressed data corresponding to the respective rectangle areas in an order from the rectangle area at the rear edge to the rectangle area at the front edge of the rectangle line.

3. The image processing apparatus according to claim 1 that is capable of rotating an image for respective areas having predetermined size in the input image for output, wherein the decompression unit decompresses the compressed data corresponding to the respective areas of the input image by performing a decompression processing for decompressing the compressed data corresponding to a predetermined number of consecutive rectangle areas that are included in the rectangle line in an order in which the compression was performed, the decompression processing being performed to all of the rectangle lines.

4. The image processing apparatus according to claim 3 further comprising a storage configured to be capable of storing at least the compressed data obtained by compressing the input image and uncompressed image data of one of the respective areas.

5. The image processing apparatus according to claim 4,
wherein, in a case where the input image is rotated by 90 degrees to the right for output, the decompression unit decompresses and rotates the compressed data corresponding to the respective rectangle areas by 90 degrees to the right for writing in the storage, and wherein, in a case where the input image is rotated by 270 degrees to the right for output, the decompression unit decompresses and rotates the compressed data corresponding to the respective rectangle areas by 270 degrees to the right for writing in the storage.

6. The image processing apparatus according to claim 5,
wherein the decompression unit performs the writing of data obtained by decompressing and rotating the compressed data corresponding to the respective rectangle areas of the rectangle lines, so that the data is arranged from the head of the longitudinal direction in the image.

7. The image processing apparatus according to claim 1,
wherein the decompression unit decompresses the compressed data in an order in which the compression was performed, obtains a start bit position of each rectangle line of the compressed data and a direct-current component value at a start of each rectangle line, and decompresses the compressed data by use of information of the start bit position and the direct-current component value, in order to rotate the input image for output.

8. The image processing apparatus according to claim 1,
wherein, in a case where the compressed data corresponding to the rectangle line is stored, the compression unit deletes the image data of the rectangle line of the input image corresponding to the compressed data that is stored.

9. The image processing apparatus according to claim 1,
wherein, in a case where data on which decompression processing is performed by an apparatus other than the image processing apparatus is decompressed and rotated by 270 degrees to the right for output, the decompression unit decompresses the data on which the compression processing is performed in a same method as a method for decompression in a case where the input image is rotated by 90 degrees to the right for output.

10. The image processing apparatus according to claim 1,
wherein the compression unit compresses the image data of the respective rectangle areas in raster order.

11. The image processing apparatus according to claim 1,
wherein an algorithm for the compression and decompression is JPEG, and the rectangle area is an MCU (Minimum Coded Unit).

12. The image processing apparatus according to claim 1 further comprising:
a reading device configured to read a document; and
a recording device configured to be capable of recording an image, which is based on the input image obtained by reading a document with the reading device, on a recording medium.

13. The image processing apparatus according to claim 12,
wherein, under a setting for performing recording on both surfaces of the recording medium,
in a case where the recording is performed on one surface of the recording medium, the image processing apparatus is controlled so that operation of the compression unit and the decompression unit in a case where the input image is rotated by 90 degrees to the right for output is performed, and
in a case where the recording is performed on another surface of the recording medium, the image processing apparatus is controlled so that operation of the compression unit and the decompression unit in a case where the input image is rotated by 270 degrees to the right for output is performed.

14. The image processing apparatus according to claim 1,
wherein the decompression unit decompresses, rotates by 270 degrees to the right, and arranges the compressed data corresponding to the respective rectangle areas, in order to output the image.

15. The image processing apparatus according to claim 1,
wherein the decompression unit decompresses, rotates by 90 degrees to the right, and arranges the compressed data corresponding to the respective rectangle areas, in order to output the image.

16. An image processing method for rotating an input image for output, the image processing method comprising:
obtaining image data of a rectangle area of the input image in an order from a rectangle line at a head of a longitudinal direction, the rectangle area being a unit for compression processing, the input image being configured such that the rectangle line configured with respective rectangle areas arranged from a front edge to a rear edge in a lateral direction is arranged in the longitudinal direction that intersects with the lateral direction;

performing the compression processing for compressing the image data on a per rectangle area basis from the rectangle area at the front edge to the rectangle area at the rear edge of the rectangle line on a per rectangle line basis in order to generate compressed data of the input image in a case where the input image is rotated by a predetermined angle in a first direction for output so that the rectangle area at the front edge in the rectangle line at the head of the input image is positioned at a head of a longitudinal direction of a rotated image; and decompressing, rotating, and arranging the compressed data corresponding to the respective rectangle areas, in order to output an image, wherein, in the compressing, in a case where the input image is rotated by the predetermined angle in a direction opposite to the first direction for output, the image data is compressed on a per rectangle area basis from the rectangle area at the rear edge to the rectangle area at the front edge of the rectangle line.

17. A non-transitory computer readable storage medium storing a program which causes a computer to perform an image processing method for rotating an input image for output, the image processing method comprising:

obtaining image data of a rectangle area of the input image in an order from a rectangle line at a head of a longitudinal direction, the rectangle area being a unit for compression processing, the input image being configured such that the rectangle line configured with respective rectangle areas arranged from a front edge to a rear edge in a lateral direction is arranged in the longitudinal direction that intersects with the lateral direction;

performing the compression processing for compressing the image data on a per rectangle area basis from the rectangle area at the front edge to the rectangle area at the rear edge of the rectangle line on a per rectangle line basis in order to generate compressed data of the input image in a case where the input image is rotated by a predetermined angle in a first direction for output so that the rectangle area at the front edge in the rectangle line at the head of the input image is positioned at a head of a longitudinal direction of a rotated image; and decompressing, rotating, and arranging the compressed data corresponding to the respective rectangle areas, in order to output an image, wherein, in the compressing, in a case where the input image is rotated by the predetermined angle in a direction opposite to the first direction for output, the image data is compressed on a per rectangle area basis from the rectangle area at the rear edge to the rectangle area at the front edge of the rectangle line.

\* \* \* \* \*